(12) United States Patent
Yamagishi et al.

(10) Patent No.: US 9,904,371 B2
(45) Date of Patent: Feb. 27, 2018

(54) GESTURE MANIPULATION DEVICE AND METHOD, PROGRAM, AND RECORDING MEDIUM

(71) Applicant: Mitsubishi Electric Corporation, Tokyo (JP)

(72) Inventors: Nobuhiko Yamagishi, Tokyo (JP); Yudai Nakamura, Tokyo (JP); Tomonori Fukuta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 78 days.

(21) Appl. No.: 14/908,513

(22) PCT Filed: May 15, 2014

(86) PCT No.: PCT/JP2014/062906
§ 371 (c)(1),
(2) Date: Jan. 28, 2016

(87) PCT Pub. No.: WO2015/037273
PCT Pub. Date: Mar. 19, 2015

(65) Prior Publication Data
US 2016/0209927 A1 Jul. 21, 2016

(30) Foreign Application Priority Data

Sep. 12, 2013 (JP) .................................. 2013-189139

(51) Int. Cl.
*G06F 3/01* (2006.01)
*G06F 3/00* (2006.01)
(Continued)

(52) U.S. Cl.
CPC .............. *G06F 3/017* (2013.01); *G06F 3/005* (2013.01); *G06F 3/0304* (2013.01);
(Continued)

(58) Field of Classification Search
CPC ........ G06F 3/017; G06F 3/005; G06F 3/0304; G06T 7/00; G06T 7/20; G06T 7/246;
(Continued)

(56) References Cited

U.S. PATENT DOCUMENTS 6,144,366 A 11/2000 Numazaki et al.
6,434,255 B1 * 8/2002 Harakawa ............... G06F 3/011
348/169

(Continued)

FOREIGN PATENT DOCUMENTS

JP 10-222285 A 8/1998
JP 2000-276602 A 10/2000
(Continued)

*Primary Examiner* — Darlene M Ritchie
(74) *Attorney, Agent, or Firm* — Birch, Stewart, Kolasch & Birch, LLP

(57) ABSTRACT

A hand region is detected in a captured image, and for each part of the background area, a light source presence degree indicating the probability that a light source is present is determined according to the luminance or color of that part; on the basis of the light source presence degree, a region in which the captured image is affected by a light source is estimated, and if the captured image includes a region estimated to be affected by a light source, whether or not a dropout has occurred in the hand region in the captured image is decided; on the basis of the result of this decision, an action is determined. Gesture determinations can be made correctly even when the hand region in the captured image is affected by a light source at the time of gesture manipulation input.

12 Claims, 26 Drawing Sheets

(51) Int. Cl.
  *G06F 3/03* (2006.01)
  *G06T 7/246* (2017.01)
  *G06K 9/00* (2006.01)

(52) U.S. Cl.
  CPC ..... *G06K 9/00355* (2013.01); *G06K 9/00832* (2013.01); *G06T 7/246* (2017.01); *G06K 9/00389* (2013.01); *G06T 2207/10016* (2013.01); *G06T 2207/30196* (2013.01)

(58) Field of Classification Search
  CPC ..... G06T 7/11; G06T 7/12; G06T 7/13; G06T 7/136; G06T 7/181; G06T 7/194; G06T 7/248; G06T 7/254; G06T 2207/10016; G06T 2207/30196; G06K 9/00832; G06K 9/00355; G06K 9/00362; G06K 9/00375; G06K 9/00382; G06K 9/00389; G06K 9/00335
  See application file for complete search history.

(56) References Cited

U.S. PATENT DOCUMENTS

| | | | |
|---|---|---|---|
| 7,566,858 B2 * | 7/2009 | Hotelling | G08C 23/04 250/208.2 |
| 8,638,989 B2 * | 1/2014 | Holz | G06K 9/3233 382/103 |
| 8,891,868 B1 * | 11/2014 | Ivanchenko | G06F 3/017 382/168 |
| 9,477,314 B2 * | 10/2016 | Alameh | G06F 3/017 |
| 2006/0284837 A1 | 12/2006 | Stenger et al. | |
| 2008/0240507 A1 | 10/2008 | Niwa et al. | |
| 2008/0284724 A1 * | 11/2008 | Alten | G06F 3/0304 345/156 |
| 2009/0102788 A1 | 4/2009 | Nishida et al. | |
| 2009/0141982 A1 | 6/2009 | Suzuki | |
| 2010/0104134 A1 * | 4/2010 | Wang | G06F 3/0304 382/103 |
| 2011/0305388 A1 * | 12/2011 | Wedi | G06T 5/005 382/165 |
| 2012/0200486 A1 * | 8/2012 | Meinel | H04N 5/33 345/156 |
| 2012/0235903 A1 * | 9/2012 | Im | G06F 3/005 345/158 |
| 2012/0249422 A1 * | 10/2012 | Tse | G06F 3/017 345/158 |
| 2013/0141327 A1 * | 6/2013 | Wei | G06F 3/011 345/156 |
| 2013/0182246 A1 * | 7/2013 | Tanase | G06F 3/042 356/218 |
| 2014/0083058 A1 * | 3/2014 | Issing | B65G 1/1378 53/473 |
| 2014/0145929 A1 * | 5/2014 | Minnen | G06F 3/011 345/156 |
| 2014/0157210 A1 * | 6/2014 | Katz | G06F 3/017 715/863 |
| 2014/0320408 A1 * | 10/2014 | Zagorsek | G06F 3/017 345/158 |
| 2016/0054858 A1 * | 2/2016 | Cronholm | G06F 3/0425 345/175 |

FOREIGN PATENT DOCUMENTS

| | | | |
|---|---|---|---|
| JP | 2004-152163 A | | 5/2004 |
| JP | 2004152163 A | * | 5/2004 |
| JP | 2006-350434 A | | 12/2006 |
| JP | 2007-52609 A | | 3/2007 |
| JP | 2008-250774 A | | 10/2008 |
| JP | 2009-104297 A | | 5/2009 |
| JP | 2009-140009 A | | 6/2009 |
| JP | 2010-79332 A | | 4/2010 |
| JP | 2011-150669 A | | 8/2011 |
| JP | 2012-73659 A | | 4/2012 |

* cited by examiner

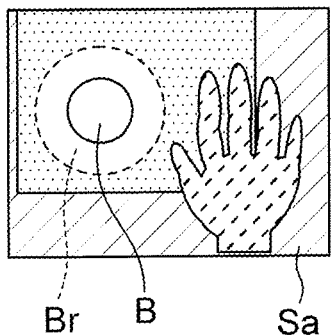 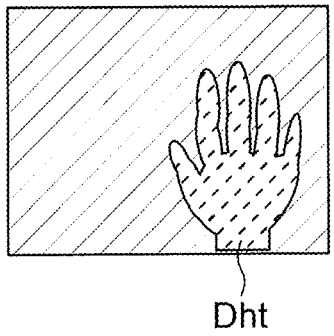 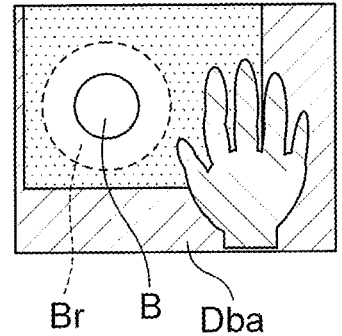
FIG. 5(a)  FIG. 5(b)  FIG. 5(c)
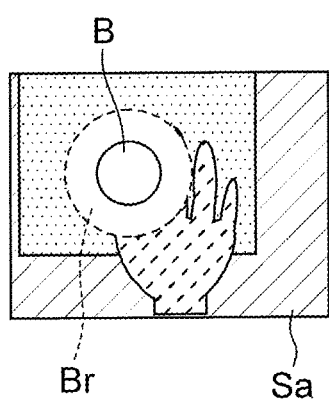 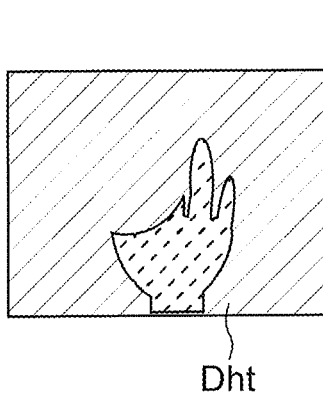 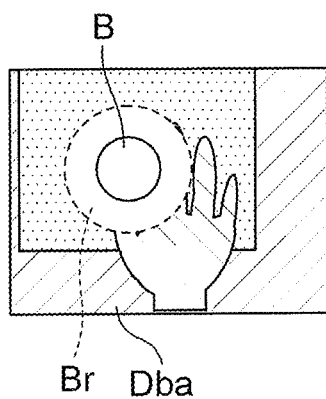
FIG. 6(a)  FIG. 6(b)  FIG. 6(c)

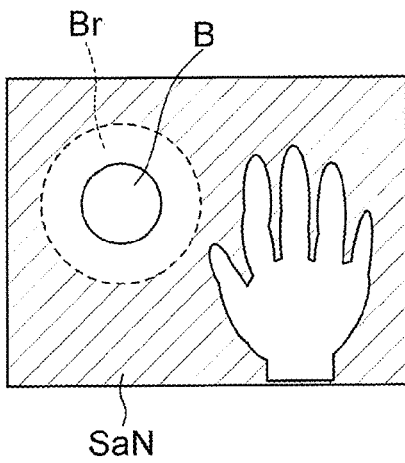 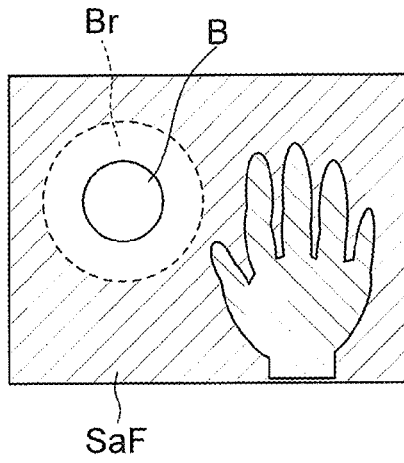
FIG. 8(a)  FIG. 8(b)
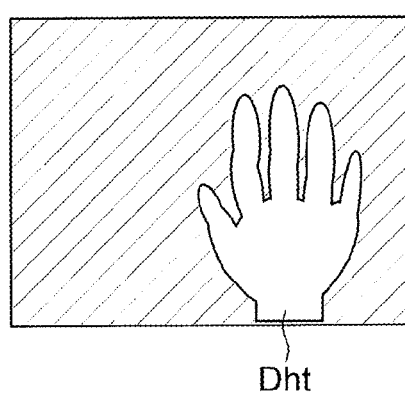 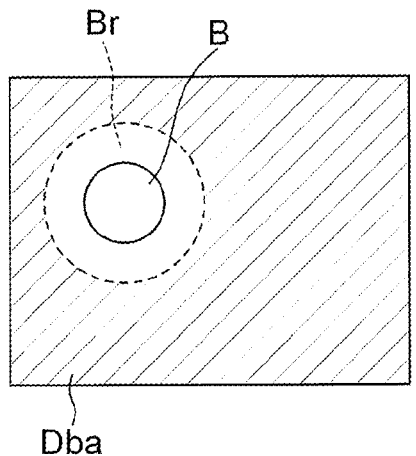
FIG. 8(c)  FIG. 8(d)
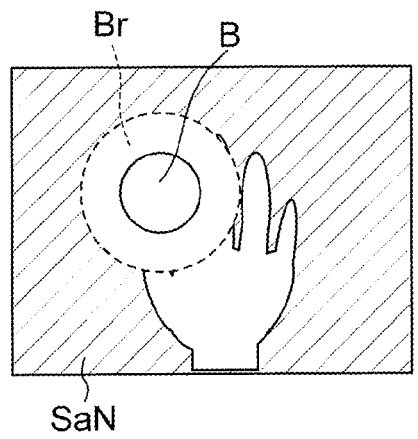 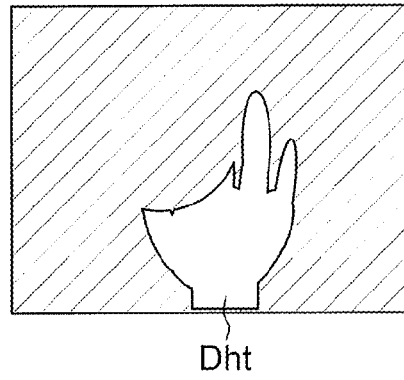
FIG. 9(a)  FIG. 9(b)

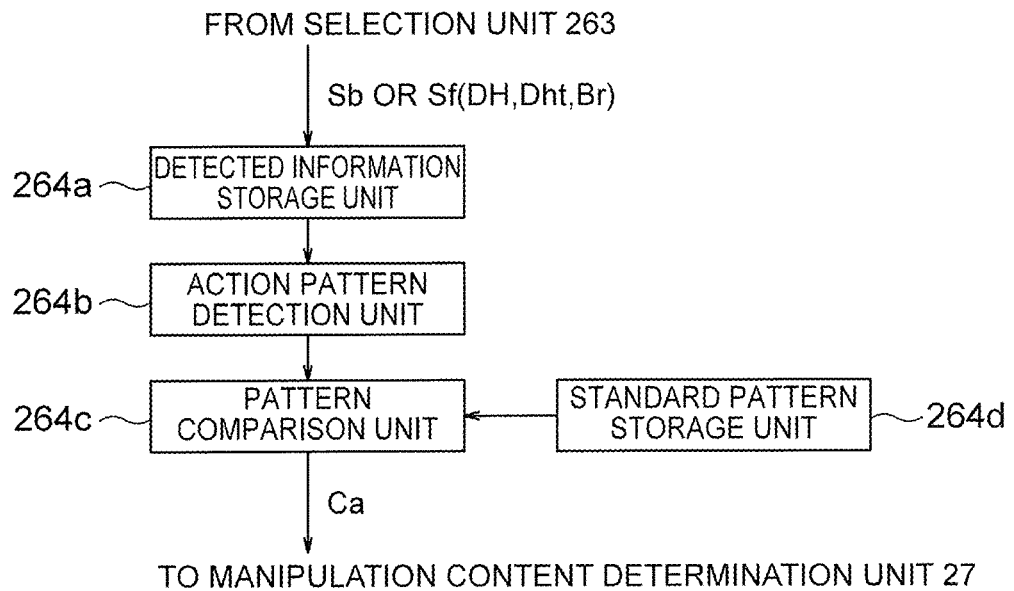
FIG. 27
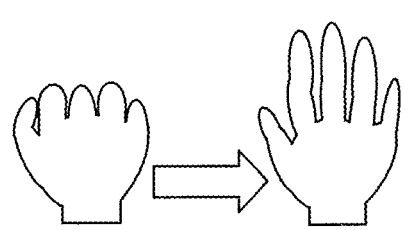 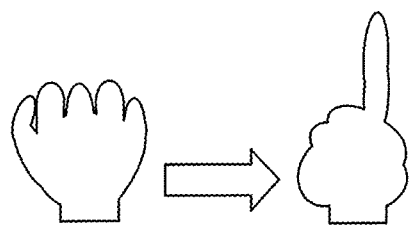
FIG. 28(a)  FIG. 28(b)

| NO. | HAND ACTION (Ca) | MANIPULATION INSTRUCTION (Cb) | |
|---|---|---|---|
| | | CONTROLLED DEVICE | ACTION OF DEVICE |
| 1 | MOVE OPENED HAND LEFT | DISPLAY UNIT | MOVE CURSOR LEFT ON DISPLAYED MENU |
| 2 | MOVE OPENED HAND RIGHT | DISPLAY UNIT | MOVE CURSOR RIGHT ON DISPLAYED MENU |
| 3 | MOVE OPENED HAND UP | AUDIO DEVICE | SET VOLUME ONE UNIT HIGHER |
| 4 | MOVE OPENED HAND DOWN | AUDIO DEVICE | SET VOLUME ONE UNIT LOWER |
| ⋮ | | | |

FIG. 30

GESTURE MANIPULATION DEVICE AND METHOD, PROGRAM, AND RECORDING MEDIUM

TECHNICAL FIELD

The present invention relates to a manipulation input device and method, and in particular to manipulation input by gestures. The manipulation input device and method according to the present invention are used for manipulation input to, for example, an information device mounted in a vehicle. The present invention also relates to a program for causing a computer to execute processing in the above-mentioned manipulation input device and method, and to a recording medium.

BACKGROUND ART

Many devices, such as car navigation devices, audio devices, and air conditioners (air conditioning devices) which are mounted in vehicles and there has been a problem for the driver, namely the increased amount of gaze movement made to manipulate buttons, check control panel displays, and perform other tasks that are necessary when these devices are operated.

To mitigate this problem, use of gesture manipulation input has been considered.

For example, a device for gesture manipulation input has been proposed (in patent reference 1, for example) that extracts an image of a hand from an image taken by an imaging means, determines the intended manipulation from the shape and movement of the hand, and notifies the user by displaying a menu item selected on the basis of the determined manipulation.

Patent reference 1 also teaches providing a visible light camera and an infrared camera as imaging means, using the visible light camera in bright surroundings, and using the infrared camera in dark surroundings.

When the infrared camera is used, in consideration of the susceptibility of infrared cameras to outdoor light effects, a method of obtaining the image of the hand by periodically switching the infrared light on and off at short intervals and calculating a difference image has been proposed (in patent reference 2, for example).

PRIOR ART REFERENCES

Patent References

Patent reference 1: JP 2009-104297
Patent reference 2: JP H10-222285

SUMMARY OF THE INVENTION

Problem to be Solved by the Invention

A problem in manipulation input devices of the type described above is that outdoor light such as, sunlight, street lights, and so on shines into the camera, affecting the image of the hand. This problem would not occur if the camera could be installed in such a way that outdoor light would not directly intrude, but in a moving automobile with windows on four sides, it is extremely difficult to install the camera in such a way as to prevent the intrusion of outdoor light. The problem is that when outdoor light intrudes, it becomes impossible, for that reason, to obtain an image of the hand correctly, and errors occur in detecting the shape of the hand.

This problem is not limited to vehicle mounted devices; similar problems occur when light from indoor lighting fixtures shines into manipulation input devices in home or office equipment.

The present invention addresses this situation, and its object is to reduce occurrence of errors in determining the shape of the hand due to the effects of light sources such as the sun and lighting fixtures.

Means for Solving the Problem

A manipulation input device according to the present invention comprises:

a hand region detection unit for detecting a hand region in a captured image obtained by imaging by an image capture unit;

a light source presence degree information generating unit for setting a light source presence degree as an index indicating a probability that a light source is present, for each part of a background region comprising a region other than the hand region detected by the hand region detection unit, on a basis of luminance or color of the part;

a light source estimation unit for estimating, on a basis of the light source presence degree, a region affected by a light source in the captured image, and determining whether or not the region estimated to be affected by the light source and the hand region detected by the hand region detection unit are within a predetermined distance of each other;

a shape analysis/evaluation unit for making a decision, on a basis of a shape of the hand region detected by the hand region detection unit, as to whether or not a dropout has occurred in the hand region in the captured image, when the region estimated according to the light source presence degree to be affected by the light source and the hand region are determined to be within the predetermined distance of each other; and an action determination unit for making a determination of an action of a hand on a basis of a result of the decision made by the shape analysis/evaluation unit and information representing the hand region detected by the hand region detection unit.

Effects of the Invention

According to the present invention, when it is determined that a dropout due to the effect of a light source has occurred in the hand region in the captured image, the hand region is corrected and the action of the hand is determined on the basis of the corrected hand region, so that gestures can be recognized accurately even when dropouts due to light sources occur in the hand region.

BRIEF DESCRIPTION OF THE DRAWINGS

FIGS. 5(a) to 5(c) are diagrams showing other examples of captured images when the image capture unit 11 is a visible light camera.

FIGS. 6(a) to 6(c) are diagrams showing still other examples of captured images when the image capture unit 11 is a visible light camera.

FIGS. 8(a) to 8(d) are diagrams showing examples of captured images when the image capture unit 11 is an infrared camera.

FIGS. 9(a) and 9(b) are diagrams showing other examples of captured images when the image capture unit 11 is an infrared camera.

FIG. 27 is a block diagram showing an example of the configuration of a action information generating unit 264 in FIG. 1.

FIGS. 28(a) and 28(b) are diagrams illustrating the operation of the action information generating unit 264 in FIG. 1.

FIG. 30 is a drawing showing examples of contents of manipulation by the manipulation content determination unit 27 in FIG. 1.

MODE FOR CARRYING OUT THE INVENTION

First Embodiment

Figure 1:
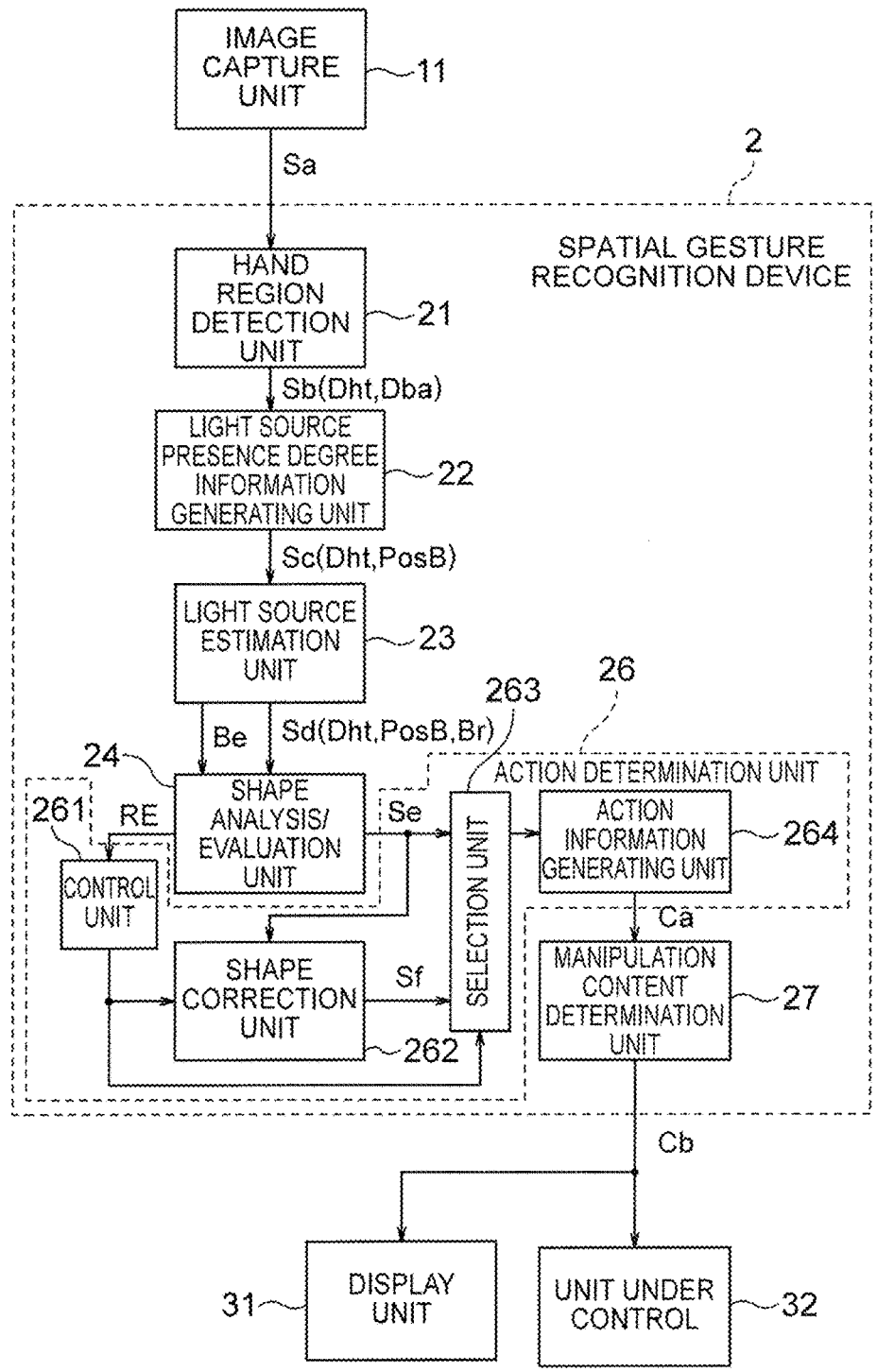
FIG. 1 is a block diagram showing the configuration of a manipulation input device according to a first embodiment of the present invention.

FIG. 1 is a block diagram showing the configuration of a manipulation input device according to a first embodiment of the present invention.

The illustrated manipulation input device is provided with an image capture unit 11, a spatial gesture recognition device 2, and a display unit 31, and controls a unit under control 32.

The spatial gesture recognition device 2 has a hand region detection unit 21, a light source presence degree information generating unit 22, a light source estimation unit 23, a shape analysis/evaluation unit 24, an action determination unit 26, and a manipulation content determination unit 27.

The functions of the constituent elements will be described below with occasional reference to the flowchart in FIG. 2.

Figure 3:
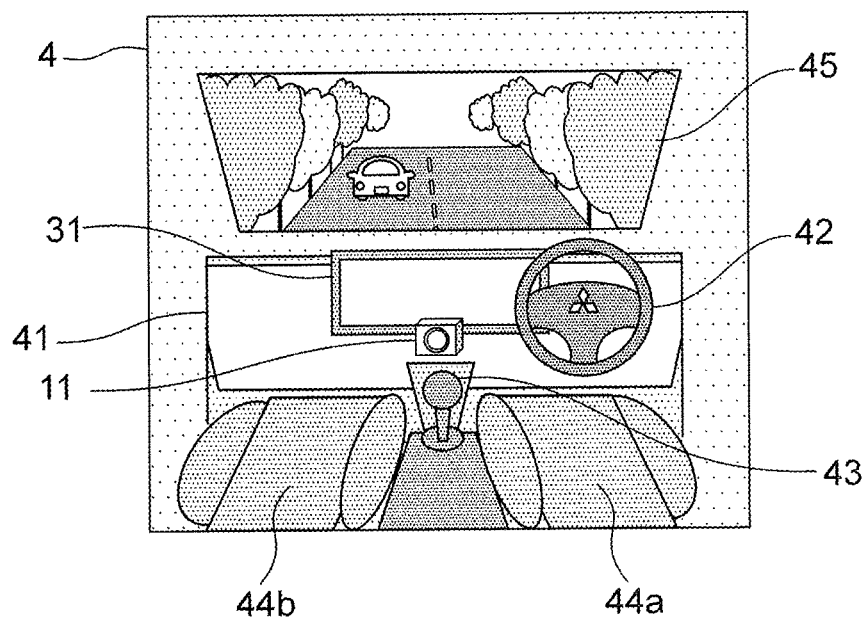
FIG. 3 is a diagram illustrating an example of placement of an image capture unit of the manipulation input device according to the first embodiment.

The manipulation input device in FIG. 1 is mounted in, for example, an automobile, and is operated by an operator seated in the driver's seat, the front passenger seat, or elsewhere. As shown in FIG. 3, a dashboard 41, a steering wheel 42, a gearshift 43, seats 44a, 44b, a windshield 45, and so on are provided near the front of the interior of the automobile 4.

The image capture unit 11 of the manipulation input device is located near the display unit 31 provided on the dashboard 41, such that it can image a space or region (operation region) RJ in which a person or persons seated in the driver's seat 44a and/or the front passenger seat 44b perform gestures for manipulation input. In particular, the image capture unit 11 is preferably installed facing in a direction in which it is possible to capture images including the space in which gestures are performed by the person(s) mentioned above. If manipulations from the back seat are also accepted, the space in which gestures are performed by an operator in the back seat is also included in the image capture range. The spatial gesture recognition device 2 may be housed inside the dashboard 41 together with, or as part of, another computing device mounted in a vehicle mounted device.

In the example shown in FIG. 3, the display unit 31 is located on the dashboard, but the type of display unit 31, its installation location etc. are not limited to this example. For example, the display may be performed on a HUD (Head Up Display) with which the windshield 45 is provided, or a plurality of display units 31 may be provided to enable the display to be seen from the back seat as well.

The image capture unit 11 that captures images of the hand is preferably installed in a location and orientation such that, as far as possible, backlighting and direct illumination by a light source are avoided. This is because although light source effects can be reduced by the present invention, such effects cannot necessarily be eliminated completely.

Instead of being located near the display unit 31 as stated above, the image capture unit 11 may be attached to the steering wheel 42, or disposed on top of the dashboard 41.

When the manipulation input device is used in a display device such as a home or office television set, display monitor, projector, or the like, the image capture unit 11 is installed so as to capture images in a direction that includes positions at which viewers are likely to be situated. For television sets and display monitors, this is the frontal direction of the display unit, but for projectors that are expected to project onto a non-transparent surface such as a wall, the image capture unit 11 is located so as to capture images in the direction opposite to the projection direction.

The image capture unit 11 obtains an image (captured image) Sa in the image capture range and outputs information representing the image Sa thus obtained, to the hand region detection unit 21 in the spatial gesture recognition device 2. The image information representing the image Sa will be denoted below by the same reference characters 'Sa' as the image itself. This practice will also be followed with other image information.

The image capture unit 11 has, for example, a camera. The camera may be either a visible light camera or an infrared camera. When an infrared camera is used, an infrared light projector such as an infrared LED is also used. The infrared camera may be configured of an ordinary visible light camera provided with an infrared filter to reject visible light components. The camera may have either a CMOS or a CCD element; it is not affected by the type.

The image capture unit 11 is assumed to be provided as part of an automobile or part of a display device or the like, but an image capture unit in an independent device, or in a device that is also used for some other purpose may be utilized. For example, a camera provided in a portable device such as a smartphone or the like may be brought into an automobile or into the vicinity of a display device, and the video from its image capture unit may be sent through a communication line to the spatial gesture recognition device 2 and used for manipulation input.

The image information Sa obtained by the image capture unit 11 is information representing a moving image and comprises a time series of frames, each representing a still image. To reduce the processing load of the computing device, the resolution is preferably low and the number of pixels is preferably small, but the number of pixels necessary for gesture determination depends also on the distance to the imaged object. In order to avoid a situation in which gesture determination cannot be achieved because of low resolution, a distance at which detection is possible is set according to the device for which the manipulation input device is used, and the number of pixels is optimized to obtain the necessary resolution at that distance.

Gesture determination also requires adequate tracking of movement, and from that viewpoint, the frame rate of the moving image is preferably at least 30 fps (frames per second).

The hand region detection unit 21 receives the image information Sa obtained by image capture by the image capture unit 11, detects a hand region Dht, and generates an image of the hand region (a hand region image) Dht and an image (background image) Dba of the region (background region) other than the hand region. The background image Dba can be obtained by removing the hand region image Dht from the image represented by the image information Sa. Information indicating the background image Dba and the hand region image Dht thus obtained is output to the light source presence degree information generating unit 22 as image information Sb (step S1 in FIG. 2). Hereafter, the 'hand region' will be denoted by the same reference characters 'Dht' as the 'hand region image', and the 'background region' will be denoted by the same reference characters Dba as the 'background image'.

The operation of the hand region detection unit 21 will now be described in more detail.

Figures 4A, 4B, 4C:
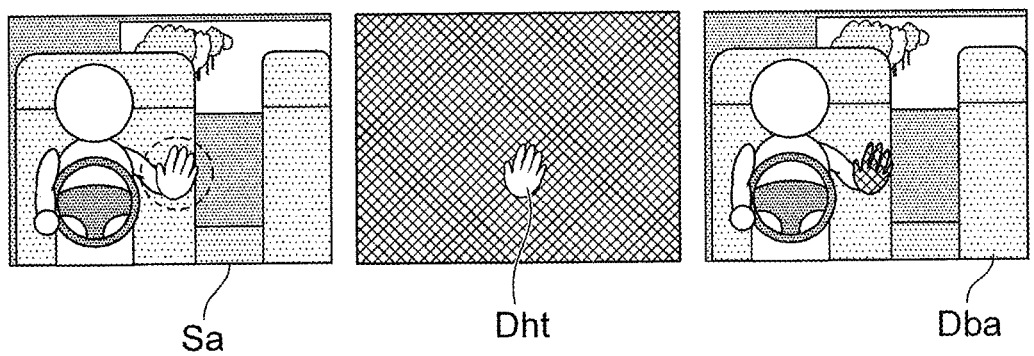
FIGS. 4(a) to 4(c) are diagrams showing examples of captured images when the image capture unit 11 is a visible light camera.

When the image is received from a visible light camera, image information Sa like that shown in FIG. 4(a) is obtained. Known means may be used to detect the hand region image Dht from the image information Sa. For example, a method that extracts skin color regions following conversion to an HSV (Hue, Saturation, Value) color space, a method that uses motion vectors, optical flows, or HOG (Histogram of Oriented Gradients) features, or any other method may be used for the detection. The method of obtaining the hand region image Dht from the images taken by a visible light camera will not be described in detail as it is not a characterizing feature of the present invention and known methods may be employed.

The hand region image Dht extracted by the hand region detection unit 21 is as shown in, for example, FIG. 4(b). The background image Dba is obtained by removing the hand region image Dht from the image Sa and is as shown in, for example, FIG. 4(c).

When the image Sa is unaffected by a light source, the shape of the hand can be detected as stated above. When a light source is included in the image Sa, however, it may be impossible to detect the hand correctly even when the hand is held open in front of the camera.

Examples in which a light source B is included in the image Sa are shown in FIGS. 5(a) and 6(a).

In the example shown in FIG. 5(a), the region of the light source B is at a distance from the region of the opened hand. In cases like this, the hand region image Dht and the background image Dba shown in FIGS. 5(b) and 5(c) can be obtained by the methods described above.

In the example shown in FIG. 6(a), however, the region of the light source B included in the image Sa overlaps the region of the opened hand. In cases like this, light from the light source B diffracts through the spaces between the fingers of the hand and even light that should be hidden by the fingers appears in the image Sa. If the hand region is detected by the hand region detection unit 21 from the image Sa like that shown in FIG. 6(a), the hand region that overlaps the region affected by the light source B (light source region Br) cannot be detected correctly, with the result that, as in FIG. 6(b), the hand region image Dht is missing the part affected by the light source B, and the background image Dba is as shown in FIG. 6(c). Thus when a light source B is present, it may happen that the hand cannot be detected correctly.

Figure 7:
FIG. 7 shows an example of an actual captured image taken by the image capture unit 11.

The images Sa shown in FIG. 6(a) etc. are simplified; an actual image Sa taken by a camera appears as in, for example, FIG. 7.

As shown in FIGS. 6(a), 6(b), and 7, when the hand is detected, it is the finger part that is most affected. This is because diffraction is a phenomenon in which light propagates around an object.

If information representing the shape of the hand is calculated and gesture determination is performed on the basis of the hand region image Dht that is affected by the light source B, an incorrect determination may be made or an intended gesture may fail to be recognized. The present invention therefore uses the light source presence degree information generating unit 22 to determine the presence of a light source B and find the region affected by it, and uses the shape analysis/evaluation unit 24 and the action determination unit 26 to mitigate the effect of the light source.

Light source effects like the one described above also arise when the image is received from an infrared camera instead of a visible light camera. An infrared camera is normally provided with an infrared emitting unit located near the camera; the camera obtains the infrared rays that strike the subject. However, since many light sources including sunlight include infrared light, even when the image Sa is taken by an infrared camera, it may still include a light source B.

As to the method of extracting background from an image taken by an infrared camera, a background image Dba and a hand region image Dht can be obtained by switching the infrared on and off at short periodic intervals and obtaining a difference image as taught in, for example, patent reference 2.

When the infrared is switched on, for example, infrared rays are reflected from the hand that receives the emitted infrared light, so that in the image SaN obtained at that time, the hand region is bright, as shown in FIG. 8(a). In the image SaF obtained when the infrared is switched off, however, the hand region is dark, as shown in FIG. 8(b), and in extreme cases is indiscernible (is completely dark).

To extract the background image Dba, after the difference between the image SaN and the image SaF has been obtained and the hand region image Dht in FIG. 8(c) has been acquired, a background image Dba as in FIG. 8(d) is obtained from the image SaN or SaF and the hand region image Dht. When the background image Dba is obtained from the image SaN and the hand region image Dht, for example, the background image Dba is obtained by setting the pixel values in the region matching the hand region image Dht to zero on the image SaN. The pixel value in the region matching the hand region image Dht may be a value based on the pixel values in the vicinity of the hand region Dht. This also applies to cases in which the background image Dba is obtained from the images SaF and Dht.

Even when an infrared camera is used, due to the effect of the light source B, the image Sa as shown in FIG. 9(a), for example, may be obtained, and consequently the hand region image Dht may also be as shown in FIG. 9(b). This image information (the hand region image Dht and the background image Dba) has features similar to those of images obtained by a visible light camera, so that light source effects can be reduced by similar processing.

Information indicating the hand region image Dht and the background image Dba as described above is output from the hand region detection unit 21 as the image information Sb.

Figure 2:
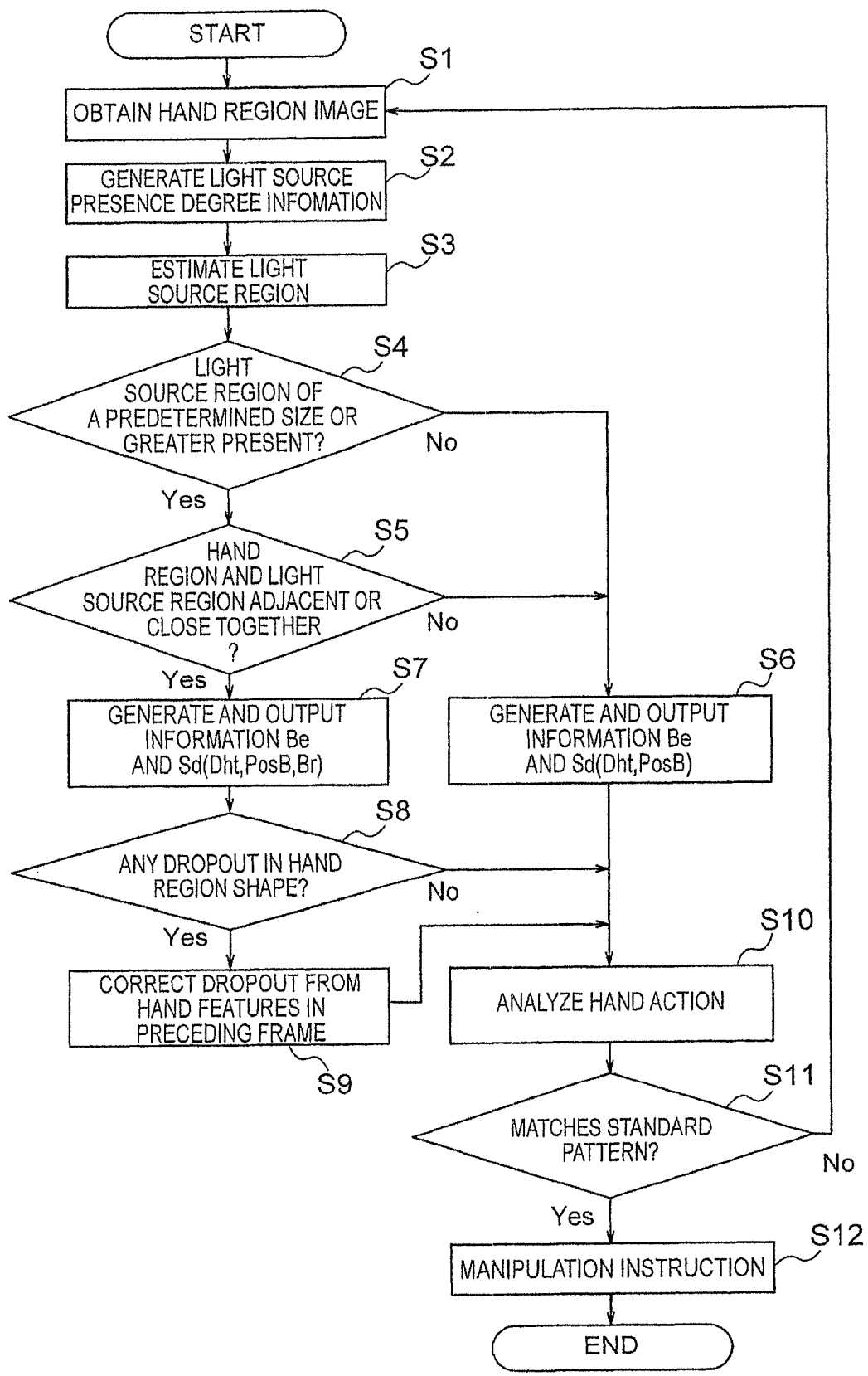
FIG. 2 is a flowchart illustrating the operation of the manipulation input device according to the first embodiment.

On the basis of the image information Sb supplied from the hand region detection unit 21, and according to luminance information of each part, e.g., each pixel or each block of the background image Dba, the light source presence degree information generating unit 22 determines a light source presence degree PosB for the above-mentioned each part, and outputs information indicating the light source presence degree PosB and the information indicating the hand region image Dht supplied from the hand region detection unit 21, to the light source estimation unit 23 as image information Sc (step S2 in FIG. 2). The light source presence degree PosB expresses the probability that a light source B is present in each part. A 'block' is a plurality of pixels in mutually adjacent or proximal positions: for example, pixels aligned in a rectangular shape, e.g., 8×8 pixels.

Figure 10:
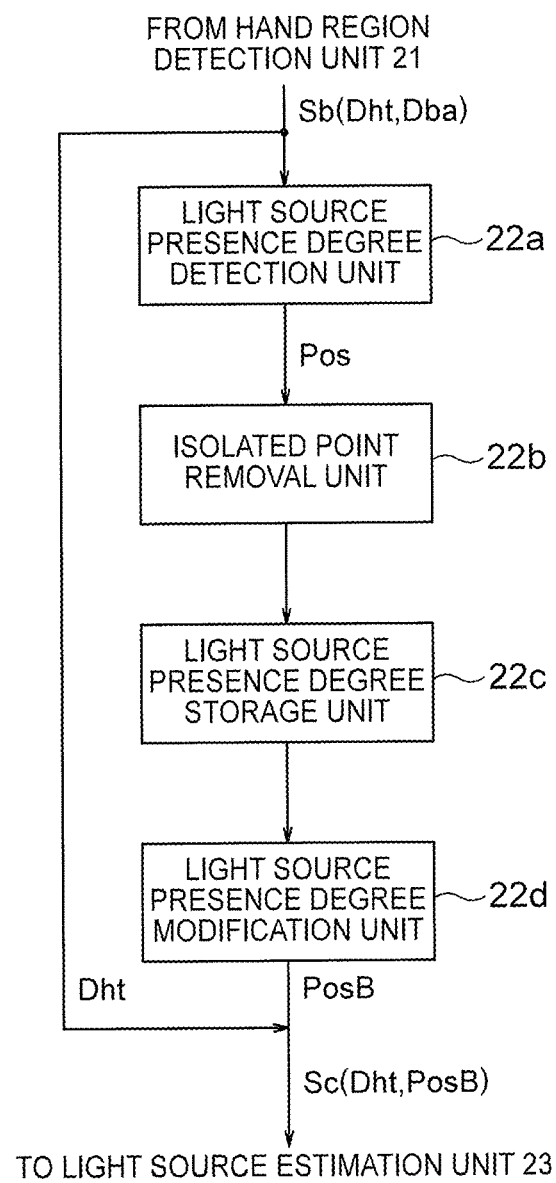
FIG. 10 is a block diagram showing an example of the configuration of a light source presence degree information generating unit 22 in FIG. 1.

As shown in FIG. 10, the light source presence degree information generating unit 22 has a light source presence degree detection unit 22a, an isolated point removal unit 22b, a light source presence degree storage unit 22c, and a light source presence degree modification unit 22d.

On the basis of the luminance information for each part of the background image Dba in each frame, for example, for each pixel or each block, the light source presence degree detection unit 22a detects a light source presence degree Pos for each part or each position in the background image. For example, on the basis of the luminance information for each part of the background image Dba in each frame, for example, for each pixel or each block, the light source presence degree detection unit 22a divides or classifies each part of the background image into a plurality of regions, and sets a light source presence degree Pos for each region generated by the classification.

Each of the plurality of regions generated by the classification need not be a continuous region and may be divided into a plurality of small regions.

The background image Dba is classified into, for example, a dark background region Dbl and a bright background region Dbh.

Figure 11A:
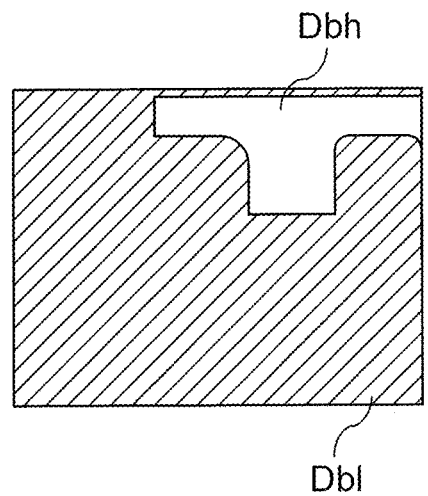
FIGS. 11(a) to 11(c) are diagrams illustrating the operation of the light source presence degree information generating unit 22 in FIG. 1.

The simplest method of performing the classification into the dark background region Dbl and the bright background region Dbh on the basis of the luminance information is to set a threshold value Tha for the luminance, classify the part below the threshold value Tha as the dark background region Dbl, and classify the part equal to or greater than the threshold value Tha as the bright background region Dbh. If the background image Dba shown in FIG. 4(c), for example, is divided into the dark background region Dbl and the bright background region Dbh by a threshold value Tha, the image region corresponding to the window part through which outdoor light enters, for example, becomes the bright background region Dbh and the image region corresponding to the interior of the car becomes the dark background region Dbl, as shown in FIG. 11(a).

Light source presence degrees Pos indicating the probability that a light source B is present are set for both the dark background region Dbl and the bright background region Dbh. In this example, the light source presence degree in the dark background region Dbl will be denoted by Posl, and the light source presence degree in the bright background region Dbh will be denoted by Posh. The light source presence degree Pos may be expressed as a percentage such as from 0 to 100, or as a ratio from 0 to 1. A light source B is inferred to be absent in the dark background region Dbl, so that the light source presence degree Posl is set low. A light source B is inferred to be included in the bright background region Dbh, so that the light source presence degree Posh is set high.

The light source presence degree Pos is expressed as a numerical value set for each part of the image (for example, for each pixel or for each block), so that, by using (x, y) to denote the coordinates indicating the position of each part of the image, the corresponding light source presence degrees Pos(x, y) can be managed as a data array on a two dimensional plane. In this case, the light source presence degree Pos(x, y) can be made a variable in a direction of a third axis, that is, a z axis, and managed by three dimensional coordinates. FIG. 11(c) shows an example of data array. As illustrated, the light source presence degree Posl in the dark background region Dbl becomes low and the light source presence degree Posh in the bright background region Dbh becomes high.

When a light source presence degree Pos is determined for each block, the average Yave of the luminance values of the pixels in each block is calculated, and the light source presence degree is determined on the basis of the average luminance value Yave.

The position of each block is expressed by the coordinates (x, y) of a representative position in the block. A particular position in the block, e.g., the central position or the position of the upper left corner, is used as the representative position.

After the initial classification into the dark background region Dbl and the bright background region Dbh by use of the threshold value Tha, the bright background region Dbh may be subdivided into smaller regions and a light source presence degree may be set for each of the smaller regions. When the bright background region Dbh is subdivided into smaller regions, a plurality of threshold values may be set for the luminance at equal intervals, or at unequal intervals.

The threshold values and the values of the light source presence degree Pos are preferably adjusted as appropriate to suit the characteristics of the image capture unit 11.

For example, if the maximum value of the luminance information obtainable by the image capture unit 11 is 230, it would be inappropriate to set the threshold value Tha for the classification into the bright background region Dbh and the dark background region Dbl, to 240. The reason is that in that case, the entire background image Dba would be classified as the dark background region Dbl.

The background image Dba may be classified into three or more regions. For example, in addition to the luminance threshold value Tha, a threshold value (second threshold value) Thb with a value set higher than threshold value (the first threshold value) Tha may be provided, the region with less luminance than the first threshold value Tha may be recognized as the dark background region, the region with luminance equal to or higher than the second threshold value Thb may be recognized as the bright background region, and the region with luminance equal to or higher than the first threshold value Tha but less than the second threshold value Thb may be recognized as an intermediate background region.

Figure 11B:
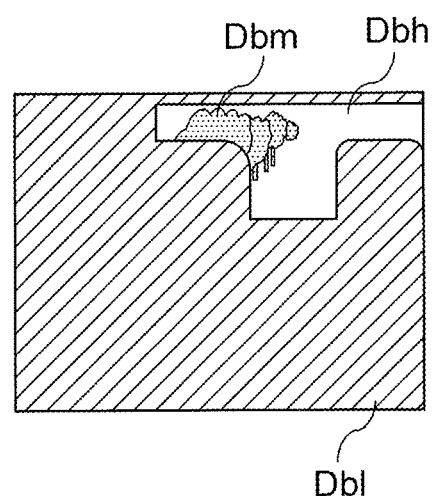
Figure 11C:
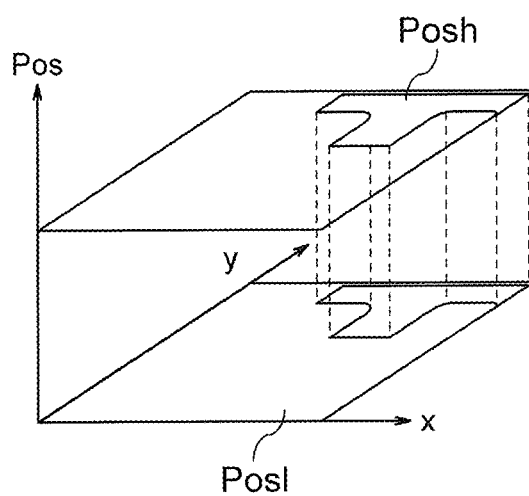

If the background image Dba in FIG. 4(c) is divided into three regions, the result is as shown, for example, in FIG. 11(b). A light source presence degree Pos is set for each region in this example as well. If the light source presence degree of the intermediate background region Dbm is denoted by Posm, the magnitude relation among the values is Posl<Posm<Posh.

In the example in FIG. 11(b), the light source presence degree is expressed by 0 to 100, the threshold values Tha and Thb for the division into the regions Dbl, Dbm, and Dbh are respectively set to 200 and 230, the light source presence degree Posl of the region Dbl (luminance range: 0 Dbl<200) is set to 0, the light source presence degree Posm of the region Dbm (200≤Dbl<230) is set to 50, and the light source presence degree Posh of the region Dbh is set to 70.

In yet another example, Posl=0 and Posm=50 can be the same as the above-described example, and Posh can be expressed by a function in which luminance is a variable. For example, if Y denotes the luminance of a pixel in the background image Dba, then since 230≤Y≤255, setting $$Posh = \{(Y-230)/(255-230)\} \times 25 + 75$$

enables the light source presence degree Posh to take values from 75 to 100. Since the value of the above-noted formula increases by a constant value (=1) each time the luminance Y increases by 1, this has the same meaning as dividing the bright region Dbh into 26 regions and setting light source presence degree that increase by 1 per region.

The number of regions into which the image is divided may be still greater.

Since the background image Dba is classified on the basis of the luminance information, if the range of values that the luminance information can take is 0-255, the maximum number of classifiable regions is 256, and if the classification threshold values are set in steps of one gradation level, the background image Dba can be divided into 256 regions Db0-Db255. In this case, there can be light source presence degrees Pos0-Pos255, and the unaltered value of the luminance information of each region can be set as its light source presence degree.

The light source presence degree detection unit 22a sets the light source presence degree Pos of each part, e.g., each pixel or each block, of the image in each frame as described above.

Although the background region is classified according to the luminance information in the above-described example, it may also be classified solely according to color information instead of the luminance information, or according to a combination of the luminance information and the color information. The color information may be the R, G, B values in the RGB color space, or the H (hue) or S (saturation) value in the HSV color space. For example, considering that the color of the light source is often obtained as white, yellow, or red pixels, these color components can be used as the bright background region Dbh and color components other than these can be used as the dark background region Dbl.

The light source presence degree Pos detected by the light source presence degree detection unit 22a is held in the light source presence degree storage unit 22c. The light source presence degree storage unit 22c has addresses corresponding to the pixels or blocks of the image Sa, and holds a light source presence degree Pos for each pixel or block.

Alternatively, information indicating the perimeter of the region in which the light source presence degree Pos of each value is set (the boundary line between the region in question and regions in which light source presence degrees Pos with other values are set) may be held in the light source presence degree storage unit 22c in association with the light source presence degree.

If the perimeter of each region is expressed as a polyline, for example, the vertex coordinates of the polyline may be held in the light source presence degree storage unit 22c in association with the light source presence degree.

Figure 12:
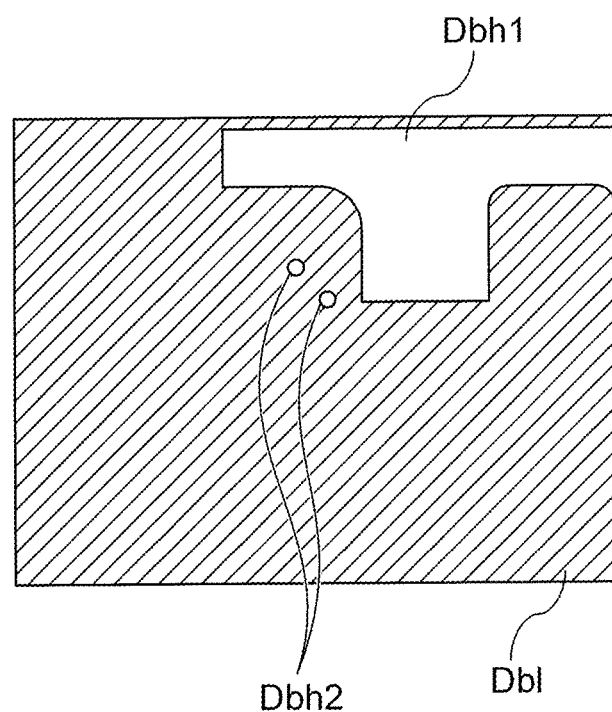
FIG. 12 is a diagram illustrating the operation of the light source presence degree information generating unit 22 in FIG. 1.

As a result of the division into regions, small bright regions Dbh2 as in FIG. 12, that is, isolated points, may occur in the interior of the dark background region Dbl. In such cases, the bright background regions Dbh2 occurring as isolated points are removed by enlargement and reduction repeated a fixed number of times, which is a general noise removal technique in image processing. Specifically, the isolated points are preferably removed by carrying out a closing process in which, after a plurality of enlargements, the same number of reductions are performed, or an opening process in which, after a plurality of reductions, the same number of enlargements are performed. The isolated point removal unit 22b is provided for such processing. The isolated point removal unit 22b receives information representing the light source presence degrees output from the light source presence degree detection unit 22a, performs the above-described removal of isolated points, and stores the data resulting from isolated point removal in the light source presence degree storage unit 22c.

As explained above, the light source presence degree Pos of each region is determined on the basis of the luminance information etc. of each frame by the light source presence degree detection unit 22a and the isolated point removal unit 22b.

The light source presence degree modification unit 22d modifies the light source presence degrees Pos in each frame by using the light source presence degrees in temporally preceding frames. This process could also be described as a process of deriving modified light source presence degrees for each frame on the basis of the light source presence degrees of each frame and temporally preceding frames.

The reason for performing such correction is as follows. In the processing of each frame, there are parts that are hidden by the hand region image Dht and the background luminance is therefore not obtained. If the hand moves, however, the background luminance may be obtainable in such parts as well. Light source presence degrees for such parts are therefore obtained by a process that covers a plurality of frames.

To modify the light source presence degrees, in the processing of each frame, a value Px signifying that the light source presence degree is unknown is provisionally set for the part hidden by the hand region. Since the hand region image Dht does not always occupy the same position, if a light source presence degree has been detected in the processing of another frame, the detected light source presence degree is used to replace the value Px.

The position of the light source may also change over time, and this must be considered when the light source presence degrees are modified.

In the case of a display device such as a television set that is installed indoors, the positional relation between the image capture unit 11 and the light source B does not change very much. The reason is that an indoor display device is usually installed in a place where it is unlikely to be affected by outdoor light, so that the light source is almost always an indoor lighting fixture. In the case of a vehicle mounted device, however, the positional relationship between the image capture unit 11 and the light source B changes constantly as the automobile moves. Since the position of the light source changes over time in this way, for this reason as well, the light source presence degrees Pos must be updated as necessary at every frame.

The captured image may also be blurred, or temporary noise may occur because of light fluctuations. Using information from a plurality of frames is an effective way to reduce these effects.

The present embodiment therefore modifies the light source presence degrees Pos obtained from the image in each frame by using the light source presence degrees Pos for one or more temporally preceding frames, and uses the modified light source presence degrees Pos. Such a process can be realized by using the light source presence degrees Pos obtained from the image in the present frame to update the modified light source presence degrees Pos determined for the frame (the preceding frame) one frame interval before.

In the updating of the light source presence degrees, priority is given to processing the positions having the provisionally set value Px. For example, with regard to a pixel or block with a light source presence degree set to the value Px in the image Sa(n−1) in a certain frame (the preceding frame), if the light source presence degree Pos(n) (x, y) of the same pixel or block in the image Sa(n) in the next frame (the current frame) is not the value Px, the light source presence degree Pos(n)(x, y) obtained in the next frame is set as the modified light source presence degree PosB for that pixel or block.

For a pixel or block with a light source presence degree set to a value other than Px, a simple average or a weighted average of the light source presence degrees Pos(n−q) (x, y), Pos(n−q+1) (x, y), . . . , Pos(n−1) (x, y) in one or more temporally preceding frames and the light source presence degree Pos(n)(x, y) in the current frame may be used as the modified light source presence degree PosB for the current frame.

When a weighted average is taken, the weighting may be done on a per frame and/or a per region basis.

For example, assigning larger weights to newer image information is preferable in view of the fact that the situation changes over time.

When weights are assigned to respective regions, assigning larger weights to regions of high brightness is preferable.

In the examples shown in FIGS. 4(a) to 4(c) and 11(a) to 11(c), for example, a larger weight is assigned to the bright background region Dbh than to the dark background region Dbl. This is because it is basically the bright regions of the background image Dba(n) that are affected by outdoor light, and the brightness changes comparatively frequently in such regions. It is also possible to store the frequency of changes in the light source presence degree of each pixel or block and set the weights according to the frequency of change.

A simple average or a weighted average of the modified light source presence degree PosB(n−1)(x, y) determined for the preceding frame and the light source presence degree Pos(n)(x, y) in the current frame may also be used as the modified light source presence degree PosB(n)(x, y) for the current frame.

In determining a weighted average in this case as well, weights may be assigned to respective regions.

Instead of taking an average as described above, it is also possible to use the median value (the value positioned in the middle when values are arranged in order of magnitude) of the light source presence degrees Pos(n−q)(x, y), Pos(n−q+1)(x, y), . . . , Pos(n−1) (x, y) in one or more temporally preceding frames and the light source presence degree Pos(n)(x, y) in the current frame as the modified light source presence degree PosB for the current frame.

The light source presence degree information generating unit 22 outputs the hand region image Dht supplied from the hand region detection unit 21 and the light source presence degrees PosB generated by the light source presence degree modification unit 22d to the light source estimation unit 23 as the image information Sc.

As described above, the light source presence degrees PosB are generated from information for a plurality of frames.

Since modified information is unobtainable when a plurality of frames cannot be obtained, e.g., when the manipulation input device has just been started up, the light source estimation unit 23 is preferably made to operate after a plurality of frames have been obtained by taking some measure, for example, designating a predetermined time (on the order of several seconds) after startup as a startup preparation time. The description below will assume that a plurality of frames have been obtained.

The light source estimation unit 23 receives the image information Sc (the hand region image Dht and the light source presence degrees PosB) output from the light source presence degree information generating unit 22, estimates light source regions Br (step S3 in FIG. 2), decides whether or not a light source region Br of a predetermined size or greater is present (step S4 in FIG. 2), decides whether or not the hand region Dht and the light source region Br are adjacent or close to one another (step S5 in FIG. 2), and outputs information (light source effect information) Be indicating the results of these decisions and image information Sd generated as a result of the above-described estimation and decisions (steps S6 and S7). The generated image information Sd includes information indicating the hand region image Dht and information indicating the light source presence degrees PosB and, when the light source effect information Be is '1', further includes information indicating the light source region Br.

The light source estimation unit 23 thereby carries out the processing in steps S3 to S7 in FIG. 2.

Figure 13:
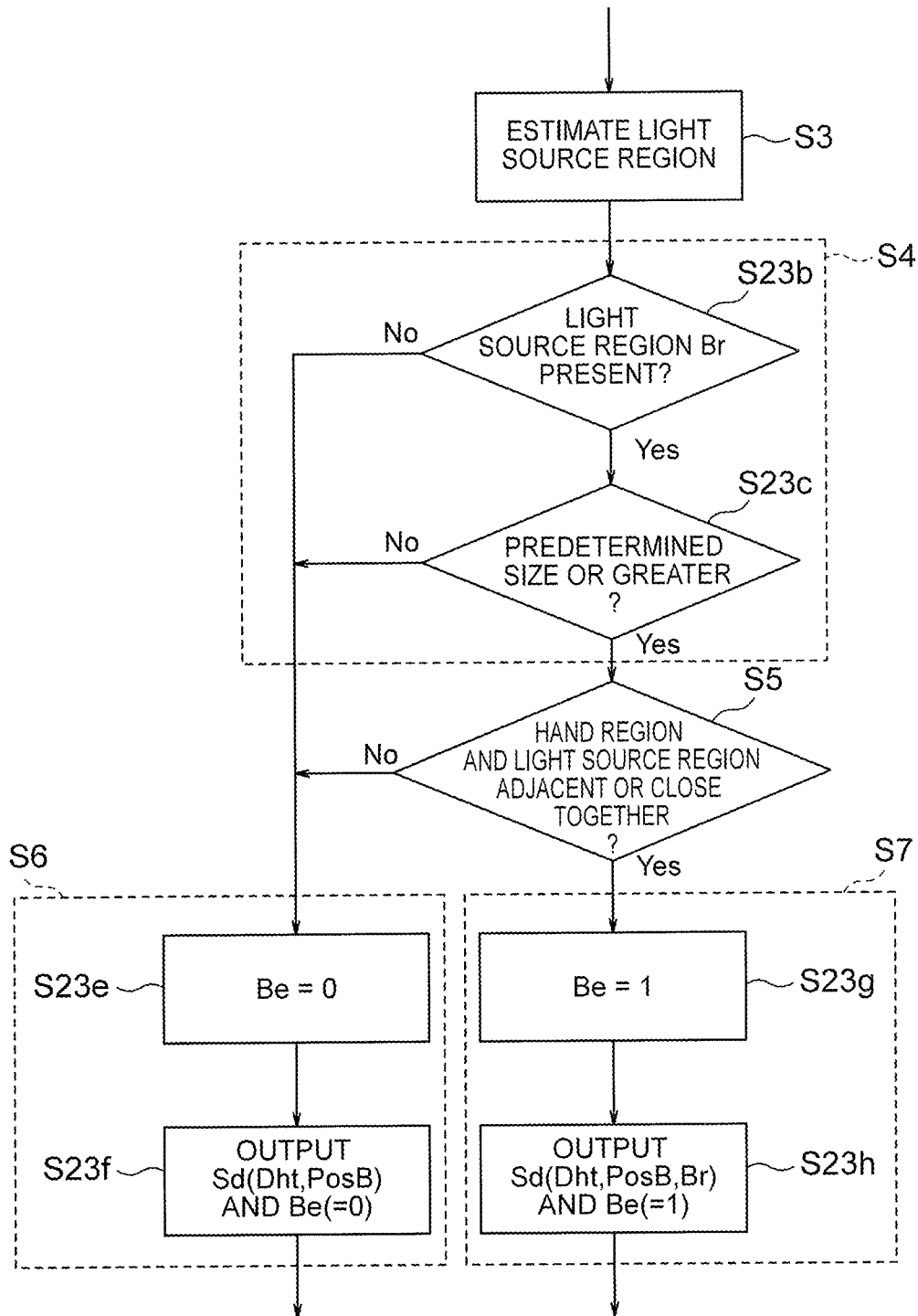
FIG. 13 is a flowchart illustrating details of the operation of a light source estimation unit 23 in FIG. 1, that is, of steps S3 to S5 in FIG. 2.

FIG. 13 illustrates the processing in the light source estimation unit 23 (steps S3 to S7 in FIG. 2) in more detail. In FIG. 13, steps that are the same as in FIG. 2 are given the same reference characters.

First, the light source estimation unit 23 decides whether or not the light source presence degree PosB of each part (each pixel or block) of the background region is equal to or greater than a threshold value Thr, and estimates that a region in which it is equal to or greater than the threshold value Thr is a light source region Br (step S3).

Next, in step S4, the light source estimation unit 23 decides whether or not a light source region Br with a predetermined size or greater is present. Here, 'a light source region Br with a predetermined size or greater' means a mutually contiguous region; even if the total size of the regions (light source regions Br) in which the light source presence degree PosB is equal to or greater than the threshold value Thr in one frame is equal to or greater than the above-mentioned 'predetermined size', that in itself does not mean that the above-mentioned condition that 'a light source region Br with a predetermined size or greater is present' is satisfied. The decision process in step S4 includes a decision as to whether or not one or more light sources Br are present (step S23b) and a decision as to whether or not any one of the light source regions Br detected in step S3 equals or exceeds a predetermined size Thsz (step S23c).

When there is no light source region Br of the predetermined size or greater (No in step S4), that is, when no light source region Br is present (No in step S23b), or when the light source region(s) Br are smaller than the predetermined size Thsz (No in step S23c), the probability that the hand region image Dht is affected by a light source is determined to be low, and the process proceeds to step S6. In step S6, the light source estimation unit 23 generates the information (light source effect information) Be indicating the results of the above-described decisions (representing a first value, e.g., '0', for example) (step S23e), outputs the generated light source effect information Be, and outputs the hand region image Dht and the light source presence degrees PosB as the image information Sd (step 23f).

For simplicity, the decision that 'the probability that the hand region image Dht is affected by a light source is low' may be referred to below as a decision that 'it is not affected by a light source'.

The output information is supplied to the shape analysis/evaluation unit 24.

When there is a light source region Br of the predetermined size or greater (Yes in step S4), that is, when a light source region Br is present (Yes in step S23b), and the light source region Br has a size equal to or greater than the predetermined size (Yes in step S23c), it is probable that the hand region image Dht has been affected by a light source B. Next, whether or not the hand region Dht in which the hand region image Dht is formed and the light source region Br are adjacent or close to one another is decided (step S5).

Figure 14A:
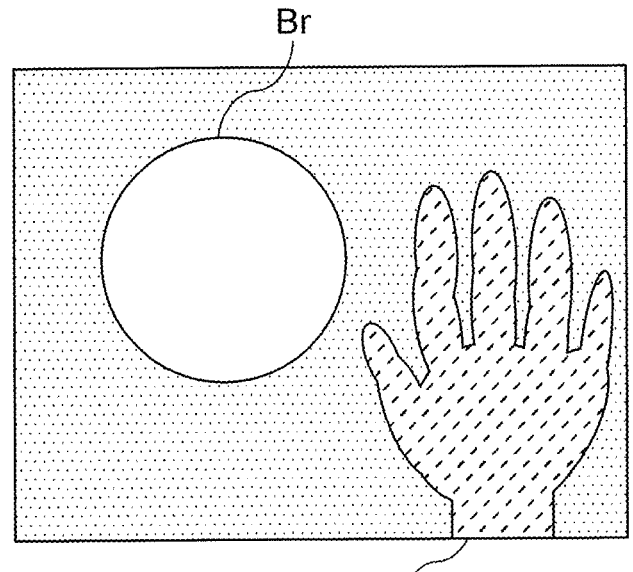
FIGS. 14(a) and 14(b) are diagrams illustrating the operation of the light source estimation unit 23 in FIG. 1.
Figure 14B:
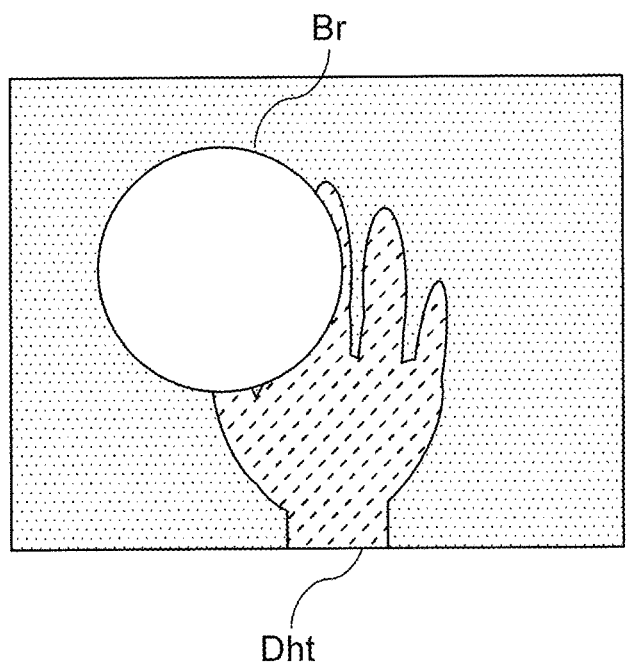

The reason for making such a decision is that when the light source region Br and the hand region Dht are positioned at a distance from each other, as in FIG. 14(a), it can be inferred that there are no diffraction effects and the hand region Dht has been detected correctly, but when the light source region Br and the hand region Dht are adjacent or close to one another, there is a high probability of diffraction effects as in FIG. 14(b).

When the light source region Br and the hand region Dht are distanced from one another (No in step S5), just as when a No is obtained in step S4 (when there is no light source region Br of the predetermined size or greater), it is decided that the hand region image Dht obtained by the hand region detection unit 21 has not been affected by a light source. In this case too, the light source estimation unit 23 outputs, to the shape analysis/evaluation unit 24, the hand region image Dht and the light source presence degrees PosB as the image information Sd, and also outputs the light source effect information Be (=0) indicating that the hand region image Dht is not affected by a light source (step S6).

The decision as to whether or not the light source region Br and the hand region Dht are adjacent is made by, for example, checking, for each pixel in the hand region image Dht, the adjacent pixel positions in the eight above/below/left/right/diagonal directions and deciding whether or not any of these adjacent pixel positions are included in the light source region Br.

Figure 15:
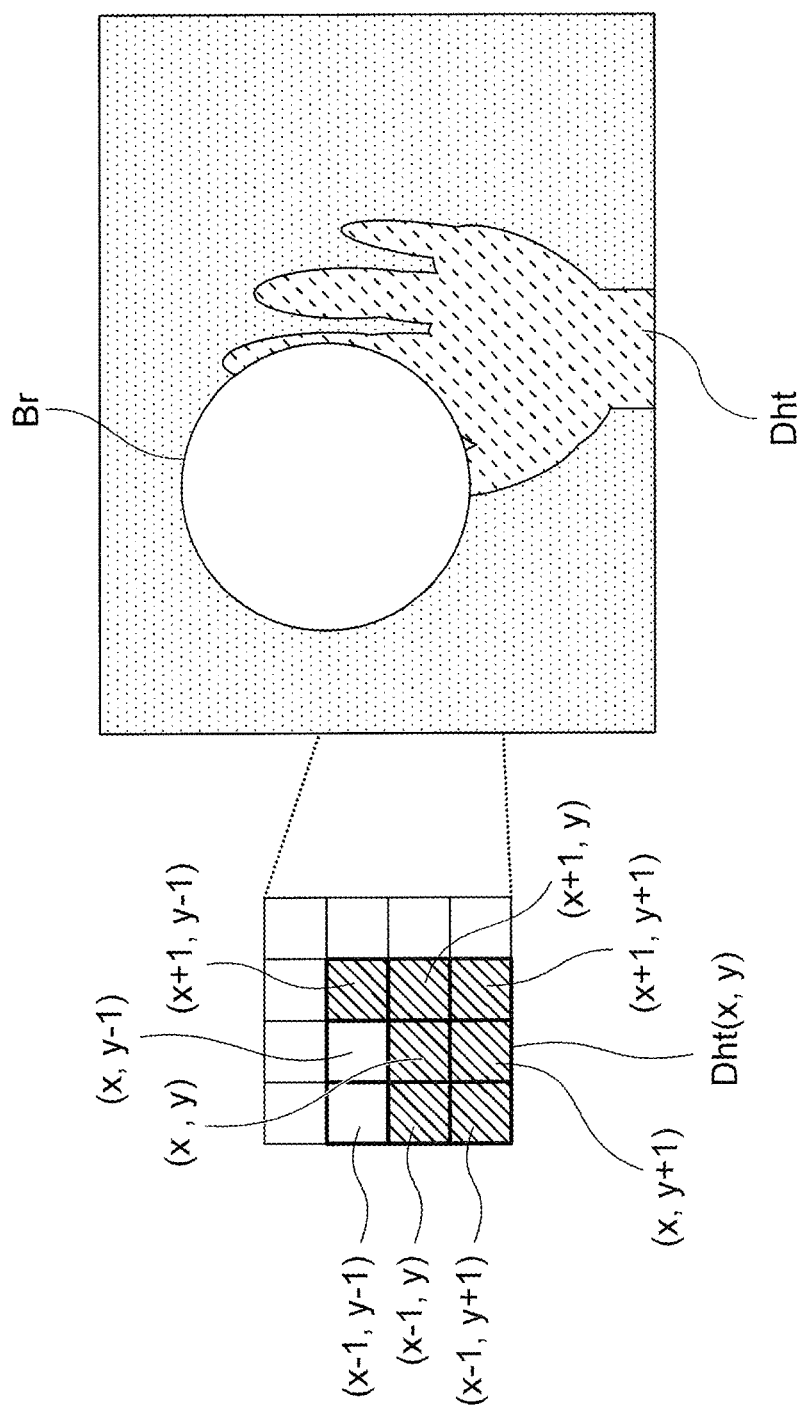
FIG. 15 is a diagram illustrating the operation of the light source estimation unit 23 in FIG. 1.

If the coordinates of a given pixel position inside the hand region Dht are denoted by (x, y), the adjacent pixel positions in the eight directions are the positions with coordinates (x−1, y), (x+1, y), (x, y−1), (x, y+1), (x−1, y−1), (x+1, y+1), (x−1, y+1), (x+1, y−1), that is, those of the positions in the 3×3 pixel region indicated by bold lines in FIG. 15 other than the central pixel position (x, y). When any of the adjacent pixel positions in the eight directions is included in the light source region Br, the hand region Dht is decided to be adjacent to the light source region Br.

The above-described decision may be carried out for all of the pixels in the hand region Dht in order to decide whether or not the light source region Br is adjacent to the hand region Dht; alternatively, the perimeter Cht of the hand region may be extracted from the hand region image Dht and the above-described decision may be carried out only for the pixels situated on the perimeter Cht of the hand region. By adopting such a method, the amount of calculation can be reduced.

Furthermore, instead of performing the decision, for each pixel, as to whether or not the adjacent pixel positions in the eight above/below/left/right/diagonal directions are included in the light source region Br, the decision about the inclusion in the light source region Br may be performed only with regard to the adjacent pixel positions in the four above/below/left/right directions. By doing so, the amount of calculation for making the decision can be reduced.

When deciding whether or not the light source region Br is close to the hand region Dht, instead of deciding whether or not the light source region Br is adjacent to the hand region Dht, for example, whether or not each of the pixels within a predetermined distance from each pixel in the hand region is included in the light source region Br is checked. If the above-mentioned predetermined distance is denoted by s, for example, all the pixels positioned to the left, in positions expressed by coordinates $(x-1,y),(x-2,y), \ldots ,(x-s,y)$ are checked.

If any of the pixels within the predetermined distance s are included in the light source region Br, the hand region Dht is decided to be close to the light source region Br.

When there is a light source region Br of the predetermined size or greater (Yes in step S4) and the hand region Dht and the light source region Br are adjacent or close to one another (Yes in step S5), there is a probability that the results of detection by the hand region detection unit 21 have been affected by the light source B. The light source estimation unit 23 therefore carries out the process in step S7. In step S7, the light source estimation unit 23 generates the light source effect information Be indicating the above-described decision result (representing a second value, e.g., '1', for example) (step S23g), outputs information indicating the hand region image Dht and the light source presence degrees PosB and information indicating the light source region Br as the image information Sd, and outputs the light source effect information Be (=1) indicating that light source effects are present in the hand region image Dht (step 23h). The output information (Sd, Be) is supplied to the shape analysis/evaluation unit 24.

Figure 16:
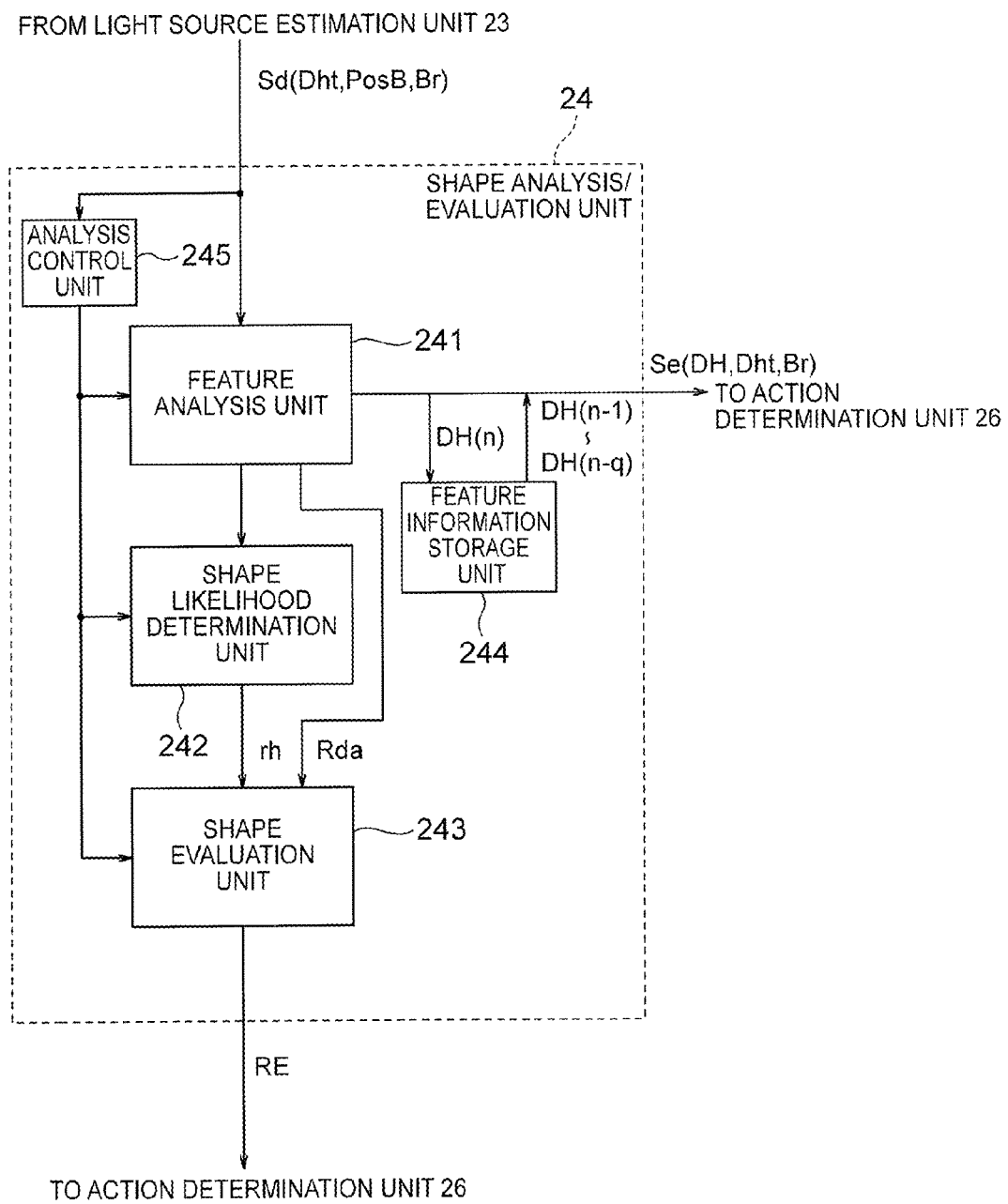
FIG. 16 is a block diagram showing an example of the configuration of a shape analysis/evaluation unit 24 in FIG. 1.

The shape analysis/evaluation unit 24 receives the image information Sd (the information indicating the hand region image Dht and the light source presence degrees PosB and the information indicating the light source region Br) and the light source effect information Be from the light source estimation unit 23. The shape analysis/evaluation unit 24 has, for example, as shown in FIG. 16, a feature analysis unit 241, a shape likelihood determination unit 242, a shape evaluation unit 243, a feature information storage unit 244, and an analysis control unit 245.

On the basis of the light source effect information Be, the analysis control unit 245 performs control for causing the processing by each of the shape likelihood determination unit 242 and the shape evaluation unit 243 to be carried out or not.

Regardless of whether or not the light source effect information Be indicates that light source effects are present (Be (=1)), the feature analysis unit 241 carries out processing, generates hand feature information DH, and outputs the generated hand feature information DH together with the information indicating the hand region image Dht and the information indicating the light source region Br included in the image information Sd from the light source estimation unit 23 as image information Se.

When the light source effect information Be is a value (Be (=1)) indicating that light source effects are present, the analysis control unit 245 causes the shape likelihood determination unit 242 and the shape evaluation unit 243 to carry out processing and causes (information indicating) a decision result RE obtained by the shape evaluation unit 243 to be output to the action determination unit 26.

When the light source effect information Be is a value (Be (=0)) indicating that light source effects are absent, the analysis control unit 245 causes the processing by the shape likelihood determination unit 242 and the shape evaluation unit 243, respectively, to be omitted.

When the shape evaluation unit 243 does not carry out the shape evaluation process, it outputs a first value, e.g., '0', as the decision result RE.

The feature analysis unit 241 calculates the hand feature information DH from the hand region image Dht included in the image information Sd of each frame as stated above. The hand feature information DH includes coordinates representing the position of the 'perimeter of the hand', and the positions of 'feature points', and information concerning the areas and lengths related thereto.

Here, 'length', for example, is the distance from the center position of a palm to the perimeter or a fingertip. 'Area' is the area of the hand region.

A 'feature point' is, for example, a 'fingertip' or a 'center of the palm'.

Figure 17:
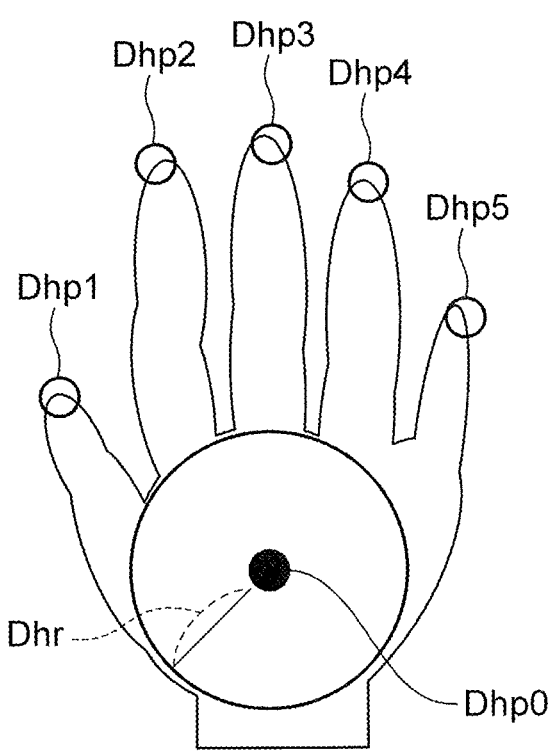
FIG. 17 is a diagram showing an example of the hand feature information DH processed by the shape analysis/evaluation unit 24 in FIG. 1.

FIG. 17 shows a specific example of the hand feature information DH.

In the example shown in FIG. 17, as feature points, the positions of the tips of the fingers, from the first finger (thumb) to the fifth finger (little finger) are indicated by Dhp1-Dhp5, respectively. As a further feature point, the position of the center of the palm is indicated by Dhp0, and the size of the palm is indicated by the radius Dhr of the largest circle that fits within the hand region Dht. The region with the radius Dhr centered at the central position Dhp0 will be referred to as the palm region.

The positions Dhp0-Dhp5 are indicated by their coordinates in the image coordinate system; the radius Dhr is indicated by its length in the image.

A method of calculating the hand feature information DH will now be described. The method described below is exemplary; the hand feature information DH may be calculated by other methods.

The hand region image Dht is just the hand region extracted from the captured image Sa; it has not undergone image processing and includes the luminance information and/or the color information.

Figure 18:
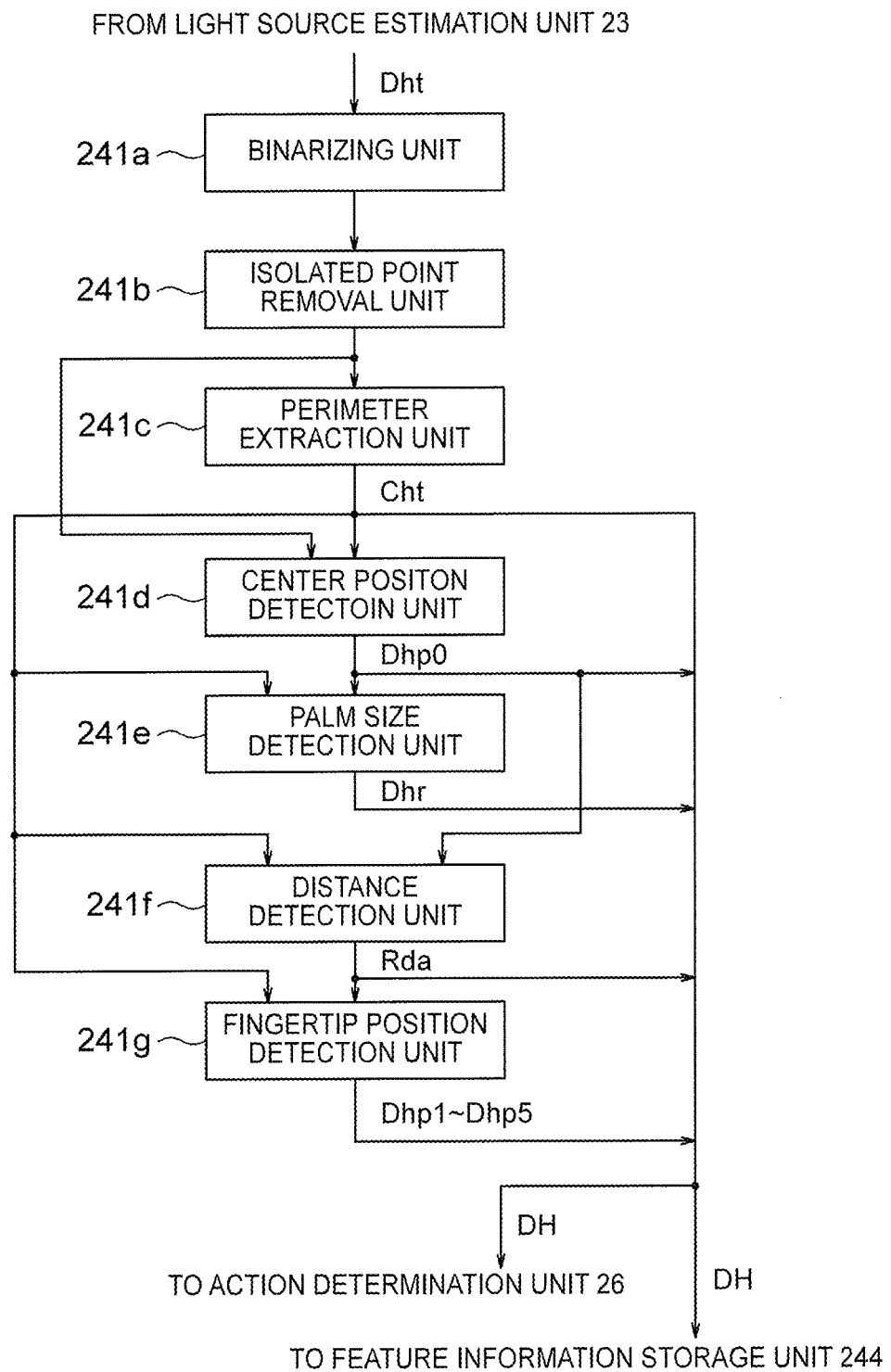
FIG. 18 is a block diagram showing an example of the configuration of a feature analysis unit 241 in FIG. 16.

As shown in FIG. 18, the feature analysis unit 241 has a binarizing unit 241a, an isolated point removal unit 241b, a perimeter extraction unit 241c, a center position detection unit 241d, a palm size detection unit 241e, a distance detection unit 241f, and a fingertip position detection unit 241g.

The binarizing unit 241a binarizes the hand region image Dht; the isolated point removal unit 241b removes isolated points by enlargement and reduction, each repeated a fixed number of times. Image processing techniques such as the closing process or opening process explained above can be used for this.

Given the hand region image on which these processes have been carried out (denoted by the same reference characters 'Dht' as the hand region image before those processes), the perimeter extraction unit 241c extracts the perimeter Cht of the hand region.

Next, the center position detection unit 241d, operating on the image after the binarization process and the removal of isolated points, calculates the shortest distance to the perimeter from points inside the hand region, detects the position at which this shortest distance is maximal, and recognizes this position as the center position Dhp0 of the palm.

The palm size detection unit 241e detects the shortest distance from the center position Dhp0 to the perimeter, and recognizes it as the size Dhr of the palm.

Next, the distance detection unit 241f calculates the distance Rda in each direction from the position Dhp0 to the perimeter of the hand region.

The direction is expressed as an angle referenced to, for example, an axis extending upward in the captured image.

This distance calculation may be performed for all directions around the center Dhp0, but here, for simplicity, description will be given on the assumption that the hand is placed in the manipulation region RJ with its fingers positioned on the upward side in the image, and the distance is calculated only in the range upward of the center position Dhp0 (from 90 degrees left to 90 degrees right).

Figure 19:
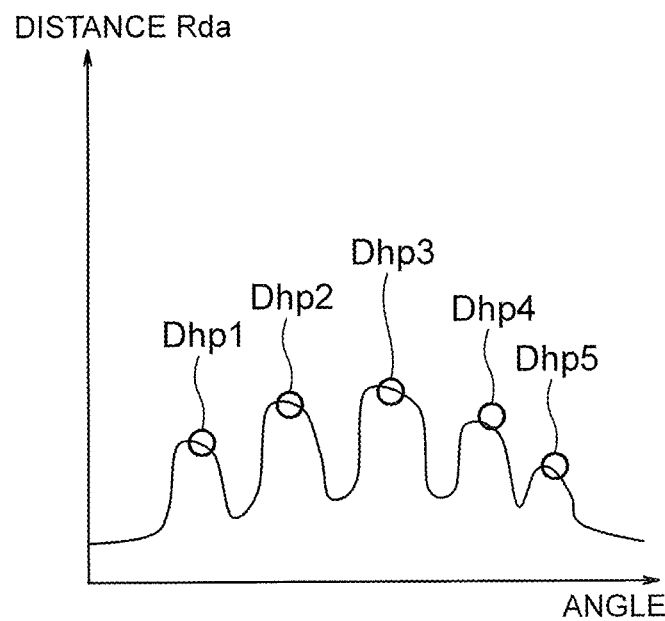
FIG. 19 is a diagram showing an example of the relation between angle and distance obtained by the shape analysis/evaluation unit 24 in FIG. 1.

If the angle (from 90 degrees left to 90 degrees right) is plotted on the horizontal axis and the distance Rda to the perimeter at each angle (in each direction) is plotted on the vertical axis, the result is as shown in, for example, FIG. 19. FIG. 19 will be referred to as an angle-distance plot. Local maxima appear in FIG. 19 in the directions (angles) of the fingertips in the hand region image. The fingertip position detection unit 241g therefore treats the positions on the perimeter in the directions in which the local maxima appear as the fingertip positions, and obtains their coordinates. The local minima in the intervals between the plurality of local maxima appear in the directions (angles) of the interdigital folds between the fingers.

The data obtained by the above-explained processing, that is, the information indicating the perimeter obtained by the perimeter extraction unit 241c, the information indicating the center position Dhp0 obtained by the center position detection unit 241d, the information indicating the palm radius Dhr obtained by the palm size detection unit 241e, the information indicating the distances Rda obtained by the distance detection unit 241f, and the information indicating the fingertip positions Dhp1-Dhp5 obtained by the fingertip position detection unit 241g, are stored in the storage unit 244 as the hand feature information DH and referred to as hand feature information DH(n−1), DH(n−2), . . . , DH(n−q) of the temporally preceding frames in the processing by a shape correction unit 262 and an action information generating unit 264 in the action determination unit 26 as described below. The number q of frames of the hand feature information that is stored may be a fixed value or a variable value, but since, depending on the content of the light source effect information Be, the hand feature information DH of temporally preceding frames may be used in the shape correction unit 262 as described below, the number stored is preferably sufficiently large as to include frames of the hand feature information DH that are not affected by a light source.

The hand feature information DH(n−1) to DH(n−q) read from the storage unit 244 and the hand feature information DH(n) output from the feature analysis unit 241, together with the information indicating the hand region image Dht and the information indicating the light source region Br included in the image information Sd from the light source estimation unit 23, are output as the image information Se.

The shape likelihood determination unit 242 receives the hand feature information DH generated by the feature analysis unit 241, in particular the information indicating the distances Rda, and evaluates the probability or likelihood that the hand feature information DH correctly represents a shape of the hand that was used for gesture manipulation input, that is, the probability or likelihood that the operator has performed a manipulation input gesture and a dropout has not occurred in the hand region image because of light source effects.

Figure 20:
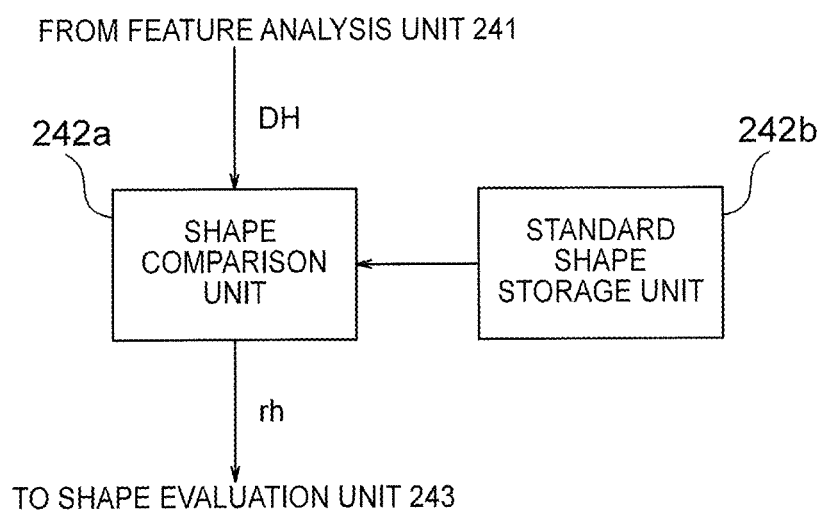
FIG. 20 is a block diagram showing an example of the configuration of a shape likelihood determination unit 242 in FIG. 16.

The shape likelihood determination unit 242 has, for example, a shape comparison unit 242a and a standard shape storage unit 242b as shown in FIG. 20.

Figure 21:
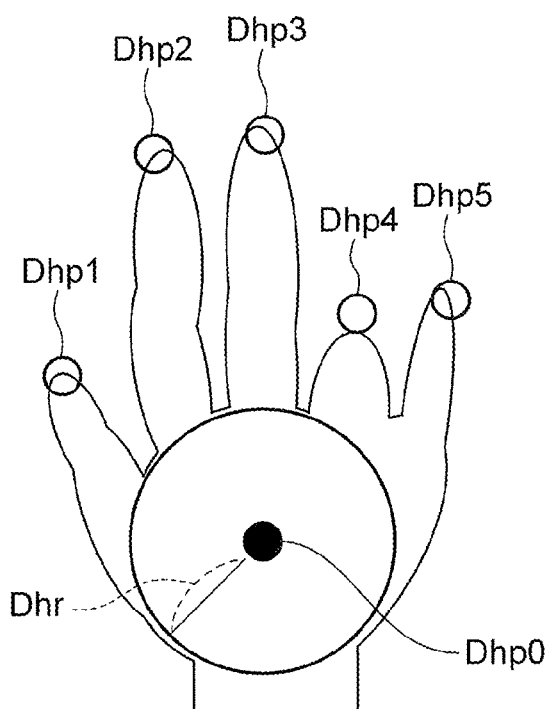
FIG. 21 is a diagram showing another example of the hand feature information DH processed by the shape analysis/evaluation unit 24 in FIG. 1.

For example, compared with the shape of an open hand or the shape of a clenched hand, the shape of a hand with only the fourth finger bent, as shown in FIG. 21, is more difficult to form.

Therefore, when the hand feature information DH represents the hand shape shown in FIG. 21, it is decided that there is a high probability that the hand feature information DH does not correctly represent the actual shape of the hand, and a high probability that a correction is needed.

The shape likelihood determination unit 242 identifies the hand shape represented by the hand feature information DH and evaluates the probability that the identified hand shape was formed for the purpose of gesture manipulation input.

For the identification of the hand shape, information (standard shape information) indicating various hand shapes (standard shapes) is preset and stored in the standard shape storage unit 242b; the shape comparison unit 242a compares the hand feature information DH with the standard information indicating the hand shapes stored in the standard shape storage unit 242b; if there is a high degree of similarity (degree of matching), it decides that the operator has formed a hand shape stored in the standard shape storage unit 242b.

Information (a probability index) rh indicating the probability that each of the standard hand shapes is formed (used) for gesture manipulation input is also set and stored in the standard shape storage unit 242b, in association with the standard shape. This information is stored in, for example, the form of a table.

As the index rh of the probability of being formed for gesture manipulation input, for example, a high probability index rh is set for the clenched hand shape (the state with five fingers bent) and the open hand shape (the state with five fingers extended). Next, an intermediate probability index rh is set for a shape with only one finger (for example, only the second finger) extended, a shape with only two fingers (for example, only the second and third fingers) extended, a shape with only three fingers (for example, only the second, third, and fourth fingers) extended, and a shape with only four fingers (for example, only the second, third, fourth and fifth fingers) extended. Finally, a low probability index rh is set for a shape with only the second, third, and fourth fingers bent.

When it is decided that there is a match with a stored standard shape (the degree of similarity is equal to or greater than a predetermined value) the probability index rh stored in association with that standard shape is output.

When the shape of the detected hand region is low in similarity to all of the standard shapes, a probability index rh with a low value is output.

On the basis of the probability index rh output from the shape likelihood determination unit 242 and the information indicating the distance Rda at each angle (each direction) generated by the feature analysis unit 241, the shape evaluation unit 243 decides whether or not the hand region detected by the hand region detection unit 21 is affected by a light source and was detected to be smaller than it actually was, that is, whether or not a dropout has occurred in the hand region in the captured image, and outputs information RE indicating the result of its decision to the action determination unit 26 (step S8 in FIG. 2).

Figure 22:
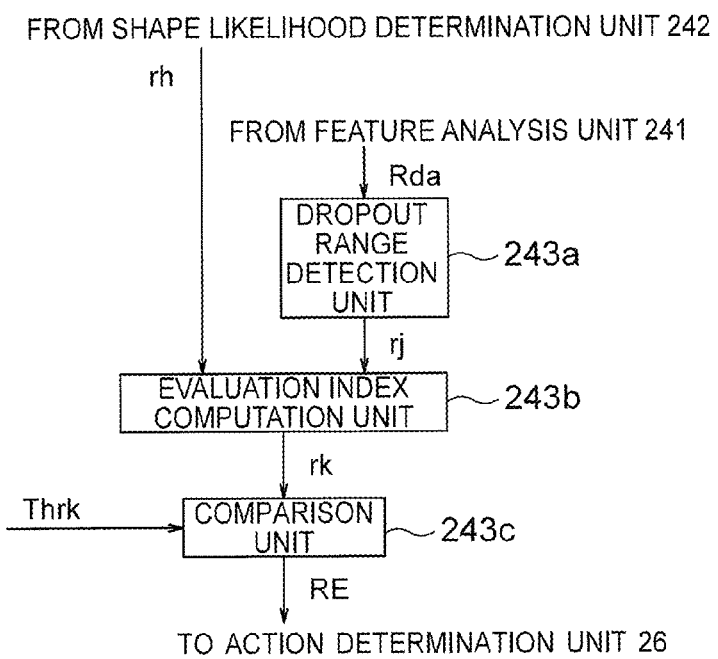
FIG. 22 is a block diagram showing an example of the configuration of a shape evaluation unit 243 in FIG. 16.

As shown in FIG. 22, the shape evaluation unit 243 has a dropout range detection unit 243a, an evaluation index computation unit 243b, and a comparison unit 243c.

The light source B is a point light source, a surface light source, or a line light source, so that the light source region Br is circular or oval. The effect that appears in the angle-distance plot is therefore that there is an angle range (direction range) over which the change in distance is gentle, and a local minimum point appears in that angle range.

Figure 23:
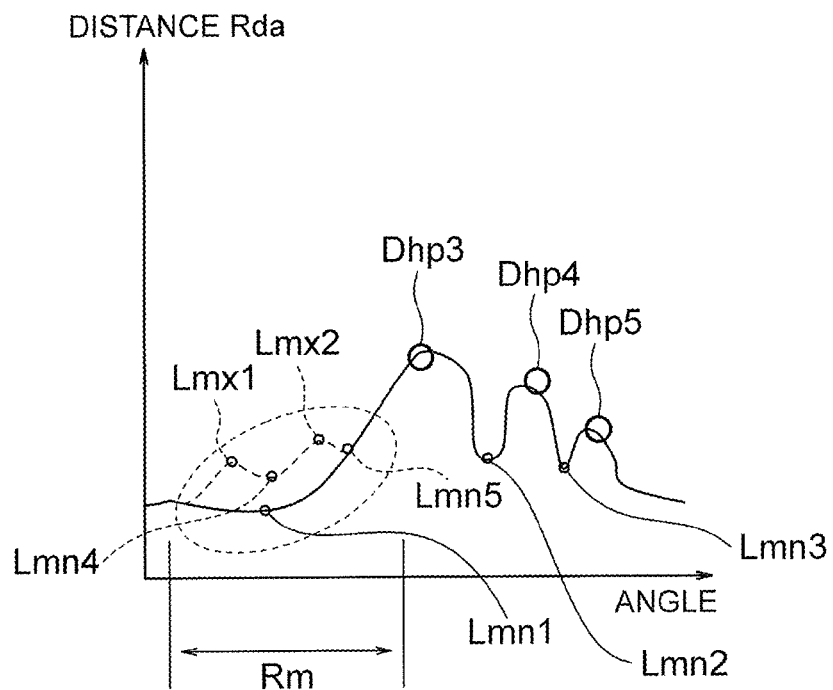
FIG. 23 is a diagram showing another example of the relation between angle and distance obtained by the shape analysis/evaluation unit 24 in FIG. 1.

An example of such a local minimum point is indicated by reference characters Lmn1 in FIG. 23. This local minimum point Lmn1 is present in an angle range Rm over which the change in distance is gentle. Moreover, there is no local maximum point in this angle range Rm. This angle range Rm may occupy a size of ⅕ or more of the range from 90 degrees left to 90 degrees right.

When only the first and second fingers are bent, the distances in the angle range Rm are reduced as indicated by the dotted line in FIG. 23, but this dotted line is upwardly convex, and local maximum points Lmx1, Lmx2 appear at the positions of the two fingers.

As also shown in FIG. 23, at the positions of the extended fingers (Dhp3-Dhp5 in FIG. 23), there is a comparatively large difference between the distances Rda of the local maximum points (fingertip positions Dhp3-Dhp5) from the center Dhp0 and the distances Rda of the local minimum points Lmn2, Lmn3 from the center Dhp0. In the angle range Rm, however, even though the local maximum points Lmx1, Lmx2 arise from the bending of the fingers, the difference in distance Rda between the local maximum points Lmx1, Lmx2 and the local minimum points Lmn4, Lmn5 is small. Thus the local maximum points are not determined to be local maximum points due to extended fingers when the difference in distance Rda from the local minimum points is small. Here, when there are adjacent local minimum points on both sides of a local maximum point, the lesser of the differences in distance is used as the difference in distance of that local maximum point from the local minimum points.

From the above, when there is only one local minimum point in an angle range Rm of a certain predetermined size or greater in the angle-distance plot, there is a high probability that a light source effect is present.

On the basis of this angle range Rm, an index rj concerning whether or not the hand region has been detected at less than its true size due to a light source effect (the presence or absence of a dropout due to a light source effect) is generated. This process is carried out by the dropout range detection unit 243a. For example, the angle range Rm in which only one local minimum point has been detected is detected as a dropout range and the index rj is calculated from the size of the dropout range Rm. This index rj is determined by, for example, $$rj = 1/Rm$$

and takes a smaller value the greater Rm is (that is, the wider the range affected by the light source is). It could accordingly be described as an index indicating the probability of not being affected by a light source.

Alternatively, the condition that 'the magnitude of the change in distance with respect to the change in angle (direction) is equal to or less than a predetermined value (the absolute value of the slope of the angle-distance curve is equal to or less than a predetermined value)' may be added to the condition that 'there is only one local minimum point' and an angle range Rm that satisfies both of these conditions may be detected as the dropout range.

The evaluation index computation unit 243b generates an evaluation index rk on the basis of the probability index rh of the shape calculated by the shape likelihood determination unit 242 and the index rj generated by the dropout range detection unit 243a.

The evaluation index rk is determined by, for example, the following formula:

$$rk = ka \cdot rh \cdot rj$$

In the formula noted above, ka is a coefficient.

Instead of multiplying rh and rj together as in the formula noted above, the value of a weighted sum of them as in the following formula, may be used as rk.

$$rk = kb \cdot rh + kc \cdot rj$$

In the formula noted above, kb and kc are weighting coefficients.

In short, it suffices to use, as rk, a value that increases as rh and rj increase. A large value of rk signifies a high probability that a hand region corresponding to a hand shape for the purpose of gesture manipulation input has been obtained correctly.

As described above, the evaluation index rk is determined on the basis of the index rh and the index rj, but since the index rj is determined on the basis of the dropout range Rm, it could also be said that the evaluation index rk is determined on the basis of the index rh and the dropout range Rm.

The comparison unit 243c decides whether or not the evaluation index rk calculated by the evaluation index computation unit 243b is equal to or greater than a predetermined threshold value Thrk and outputs the decision result RE to the action determination unit 26. The decision result RE indicates whether or not a dropout due to a light source effect has occurred in the hand region Dht in the captured image.

If the evaluation index rk is equal to or greater than the threshold value Thrk, that is, if it is decided that no dropout due to a light source effect has occurred, the decision result RE will become one representing a first value, e.g., '0'.

If the evaluation index rk is less than the threshold value Thrk, that is, if it is decided that a dropout due to light source effects has occurred, the decision result RE will become one representing a second value, e.g., '1'.

If Be is of the first value '0' and the shape evaluation unit 243 does not carry out the shape evaluation process, the decision result RE keeps the first value '0' mentioned above.

The decision result RE is supplied together with the image information Se noted earlier to the action determination unit 26.

When no effect due to a light source B is present, the information indicating the light source region Br is not output, so that the shape analysis/evaluation unit 24 may decide whether or not a light source effect is present on the basis of the presence or absence of a light source region Br, without having the light source estimation unit 23 output the light source effect information Be.

The action determination unit 26 determines the action of the hand on the basis of the decision result RE and the image information Se output from the shape analysis/evaluation unit 24.

The action determination unit 26 has a control unit 261, the shape correction unit 262, a selection unit 263, and the action information generating unit 264.

The control unit 261 controls the shape correction unit 262 and the selection unit 263 according to the decision result RE.

Specifically, when the decision result RE represents the first value '0', that is, when it has been decided that no dropout due to light source effects has occurred in the hand region Dht in the captured image, the control unit 261 does not let the shape correction unit 262 perform a correction and has the selection unit 263 select the image information Se output from the shape analysis/evaluation unit 24.

When the decision result RE represents the second value '1', that is, when it has been decided that a dropout due to light source effects has occurred in the hand region Dht in the captured image, the control unit 261 causes the shape correction unit 262 to perform a correction and has the selection unit 263 select image information Sf output from the shape correction unit 262.

The image information Se or Sf selected by the selection unit 263 is supplied to the action information generating unit 264.

The shape correction unit 262 corrects the hand feature information DH representing the shape of the hand region detected by the hand region detection unit 21; specifically, it receives the image information Se supplied from the feature analysis unit 241 and the feature information storage unit 244 in the shape analysis/evaluation unit 24 (the hand feature information DH(n) to DH(n−q) of the current frame and the temporally preceding frames, as well as the information indicating the hand region image Dht and the light source region Br in the current frame), on the basis of which it corrects the hand feature information DH(n) of the current frame n and generates corrected hand feature information DHe(n) (step S9 in FIG. 2).

The following description will take up an example of a correction to information representing a feature point, e.g., a fingertip position among the hand feature information DH(n).

Figure 24:
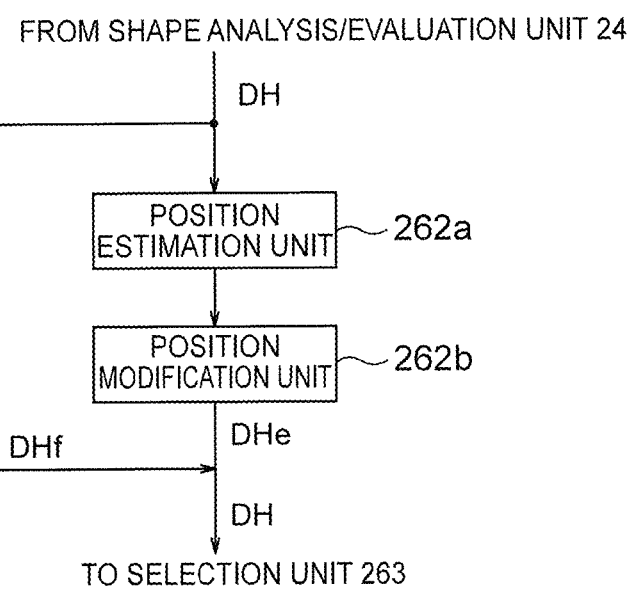
FIG. 24 is a block diagram showing an example of the configuration of a shape correction unit 262 in FIG. 1.

As shown in FIG. 24, the shape correction unit 262 has a position estimation unit 262a and a position modification unit 262b.

The position estimation unit 262a estimates the positions of hand shape feature points, e.g., the fingertip positions, that were not obtained in each frame because of light source effects.

Figure 25A:
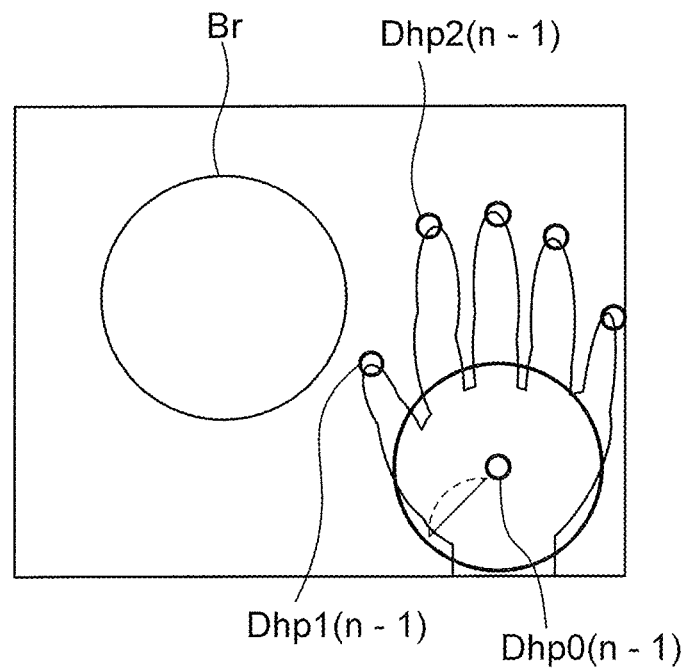
FIGS. 25(a) and 25(b) are diagrams illustrating the operation of the shape correction unit 262 in FIG. 1.
Figure 25B:
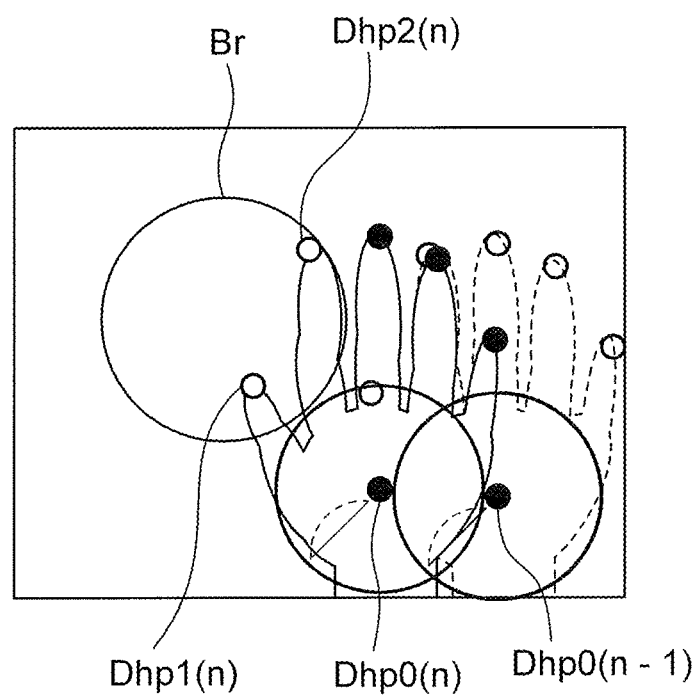

It is assumed that there is a dropout in the hand feature information DH(n) of the current frame n because of light source effects such that information indicating the fingertip positions Dhp1(n) and Dhp2(n) of the first finger and the second finger is not obtained, as shown in FIG. 25(b), but information indicating the fingertip positions Dhp1(n−1) and Dhp2(n−1) of the first finger and the second finger was obtained in the preceding frame (n−1), as shown in FIG. 25(a). In this case, the hand feature information DH(n−1) of the preceding frame is used to estimate the fingertip positions in the current frame n and the hand feature information DH(n) of the current frame n is corrected to indicate the estimated fingertip positions.

There is a high probability that, in the hand feature information DH(n), the palm center position Dhp0(n) can be detected even when the hand region is affected by a light source. The reason is that diffraction is a phenomenon in which light appears to bend around the edges of the hand and through the spaces between fingers, so that slender parts such as fingers are affected the most while there are few effects on parts with large areas, such as the palm.

The fingertip position Dhp1(n) of the first finger in the hand feature information DH(n) is estimated by using the difference between the palm center position Dhp0(n−1) in the preceding frame and the palm center position Dhp0(n) in the current frame, and the fingertip position Dhp1(n−1) of the first finger in the preceding frame. It is assumed in this case that the positional relation between the palm center and fingertips of the hand does not change between the preceding frame and the current frame, so that if $$Dhp0(n-1)=(xb0, yb0),$$

$$Dhp1(n-1)=(xb1, yb1), \text{ and}$$

$$Dhp0(n)=(xn0, yn0)$$

then it can be estimated that $$Dhp1(n)=(xb1+(xn0-xb0), yb1+(yn0-yb0))$$

The fingertip positions Dhp2(n) to Dhp5(n) of the other fingers can be estimated in the same way if necessary.

When it is necessary to make a distinction from the hand feature information DH obtained by the shape analysis/evaluation unit 24, all of the hand feature information obtained by estimation will be denoted by DHe; similarly, the information indicating the fingertip positions of the individual fingers obtained by estimation will be denoted by Dhpe1-Dhpe5.

The position modification unit 262b decides whether or not the fingertip positions estimated by the position estimation unit 262a, that is, the positions indicated by the hand feature information DHe obtained by estimation, are inside a light source region Br that is adjacent or close to the hand region Dht, and modifies the hand feature information DHe on the basis of the result of its decision. The modified hand feature information will be denoted by the same reference characters DHe. The decision as to whether or not the positions indicated by the hand feature information DHe obtained by estimation by the position estimation unit 262a are inside a light source region Br that is adjacent or close to the hand region Dht can be based on whether or not each of the pixels on the line segments L1, L2 joining the palm center Dhp0(n) to the estimated fingertip positions Dhpe1(n) and Dhpe2(n) is included in either of the light source region Br and the hand region Dht.

If the light source estimation unit 23 decided whether or not the light source region Br and the hand region Dht are adjacent, the position modification unit 262b decides whether or not the estimated fingertip position Dhpe1(n) is positioned inside a light source region Br adjacent to the hand region Dht. In that case it checks all of the pixels on the line segment L1 joining the palm center position Dhp0(n) and the position Dhpe1(n) (including the pixel at the estimated fingertip position Dhpe1(n)), as shown in FIGS. 26(a) and 26(b).

Figure 26A:
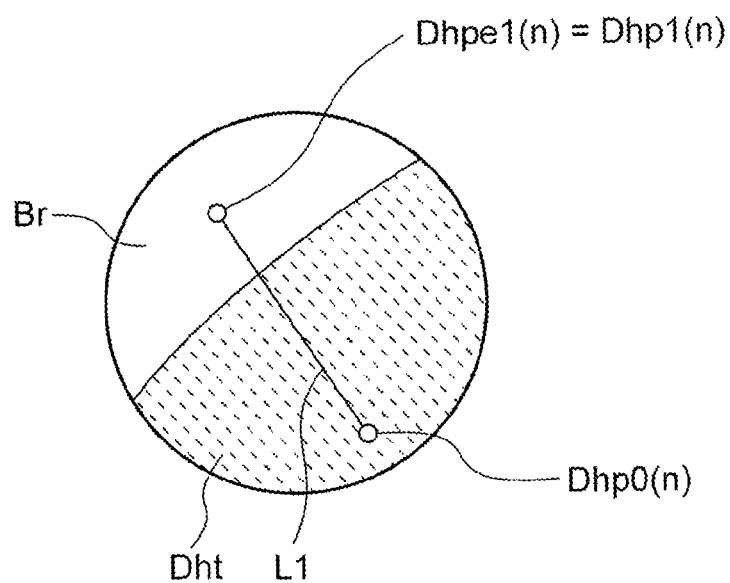
FIGS. 26(a) and 26(b) are diagrams illustrating the operation of a position modification unit 262b in FIG. 24.

When all of the pixels on the line segment L1 are positioned in the light source region Br or in the hand region Dht as shown in FIG. 26(a) (that is, when no pixel on the line segment L1 is positioned in the background region outside the light source region Br), the estimated fingertip position Dhpe1(n) is used as the correctly corrected fingertip position Dhp1(n).

Figure 26B:
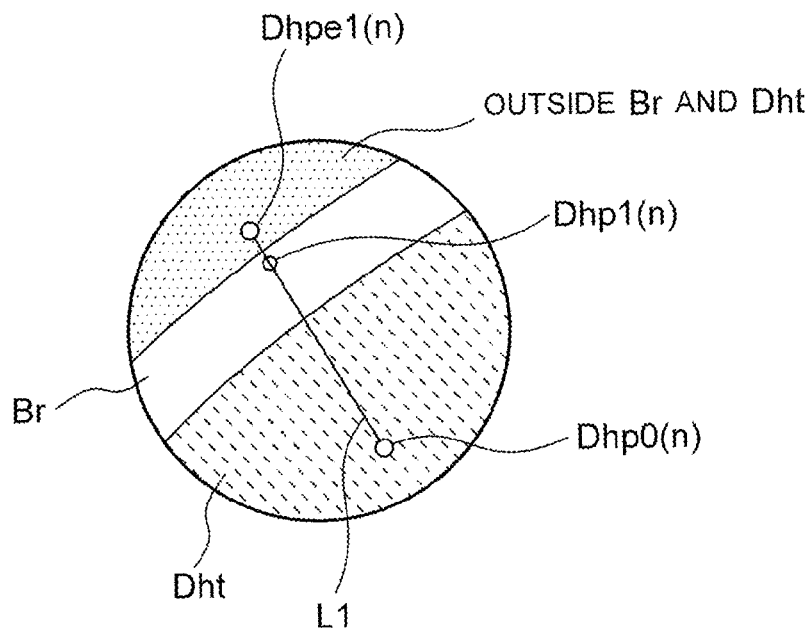

When any one or more of the pixels on the line segment L1 are positioned outside the light source region Br and the hand region Dht (are positioned in the background region outside the light source region) as shown in FIG. 26(b), the position of the pixel that is adjacent to a pixel closest, among those pixels, to the center position Dhp0(n), and that is positioned on the side of the center position Dhp0(n) (positioned inside the light source region Br or the hand region Dht) is used as the corrected fingertip position Dhp1(n).

If the light source estimation unit 23 decided whether or not the light source region Br and the hand region Dht are close to one another, the position modification unit 262b decides whether or not the estimated fingertip position Dhpe1(n) is positioned inside the light source region Br that is close (at a distance of s or less) to the hand region Dht. In that case, of the pixels on the line segment L1, the pixels close to the hand region Dht, that is, the pixels within a distance of s from the hand region Dht, are regarded as being positioned inside the light source region Br even though they are not positioned inside the light source region Br. The rest is the same as when it 'decides whether or not . . . is positioned inside a light source region Br adjacent to the hand region Dht' as described above.

When information indicating a corrected fingertip position is obtained as a result of estimation by the position estimation unit 262a or as a result of correction by the position modification unit 262b, part of the hand feature information DH output from the shape analysis/evaluation unit 24 is replaced by the information generated by the position estimation unit 262a or the position modification unit 262b to become the corrected hand feature information DHe.

As described above, a missing hand region can thereby be reconstituted by checking the pixels on the line segment L1 and changing the recognition of a region that was decided to be part of the light source region Br (not part of the hand region) so that it is recognized as part of the hand region (thereby expanding the hand region).

The result of the processing carried out by the position estimation unit 262a and the position modification unit 262b described above may be used by the light source presence degree modification unit 22d in the light source presence degree information generating unit 22 to further modify or update the value of the light source presence degrees PosB.

For example, since it has been decided that a light source is present at the corrected fingertip position in the current frame and that a light source effect was present, the subsequent light source presence degrees at the same position may be set to larger values. If the light source presence degrees take values in the range from 0 to 100, for example, the light source presence degrees can be brought closer to 100, making it more likely that the same position will be recognized as being in a light source region Br in the processing of the next frame and thereafter.

A case in which, of the hand feature information DH, the information indicating a fingertip position is corrected has been described above, but it is also possible to correct information indicating feature points other than fingertips, or information indicating hand features other than feature points, e.g., information indicating the position of the perimeter of the hand, or information indicating the length of the hand shape (for example, the radius of the palm) or its area (for example, the area of the palm region).

The hand feature information DHe generated by the position estimation unit 262a and the position modification unit 262b as described above is combined with the part DHf of the hand feature information DH generated by the shape analysis/evaluation unit 24 that was not replaced with information generated by the position estimation unit 262a or the position modification unit 262b, and this combined information DHe and DHf is output, together with the information indicating the hand region image Dht and the information indicating the light source region Br included in the image information Sd from the light source estimation unit 23, through the selection unit 263 to the action information generating unit 264 as the image information Sf.

In view of the low reliability of the hand feature information DHe obtained by correction as compared with the hand feature information generated by the shape analysis/evaluation unit 24 (the hand feature information DHf concerning different parts of the image in the same frame as the hand feature information DHe, and the hand feature information DH concerning parts of the images in frames differing from the hand feature information DHe), different reliability values R may be set for the hand feature information DHe and the hand feature information DHf, DH generated by the shape analysis/evaluation unit 24 (setting the reliability of the hand feature information DHe lower than the reliability of the hand feature information DHf, DH generated by the shape analysis/evaluation unit 24), and when the shape or movement of the hand is determined in the action information generating unit 264, the reliability R may be used as a weight.

The action information generating unit 264 obtains the image information Se (the hand feature information DH) output from the shape analysis/evaluation unit 24 or the image information Sf (the hand feature information DH configured of a combination of the hand feature information DHe and the hand feature information DHf) output from the shape correction unit 262, analyzes the action of the hand, and generates, and outputs to the manipulation content determination unit 27, information indicating the hand action Ca obtained as a result of its analysis (step S10 in FIG. 2). The hand action analysis includes discrimination of or decision on the hand shape and discrimination of or decision on a change therein. A decision on a change is made by detecting a change between temporally differing frames (a change in the current frame with respect to a preceding frame). Maintaining the same shape for at least a predetermined time, for example, is included among the hand actions.

If, in the decision on the shape and movement of the hand, different reliability values are set for the hand feature information DHe generated by correction by the shape correction unit 262 and the hand feature information DHf, DH output from the shape analysis/evaluation unit 24, as described above, the reliability R may be used as a weight.

The hand shape in each frame may be classified or distinguished in the action information generating unit 264 from the palm center position Dph0, the fingertip positions Dhp1-Dhp5 etc. included in the hand feature information DH.

For example, the classification or distinction may be made according to whether or not the hand is in a clenched (rock) state, whether or not the hand is an opened (paper) state, how many fingers are extended, and so on.

As shown in FIG. 27, the action information generating unit 264 has a detected information storage unit 264a, an action pattern detection unit 264b, a pattern comparison unit 264c, and a standard pattern storage unit 264d.

To determine the action of the hand, the detected information storage unit 264a stores the hand feature information DH in each frame (which, in some cases, is configured of a combination of the hand feature information DHf and DHe from the shape correction unit 262); the action pattern detection unit 264b analyzes the hand feature information DH in a plurality of mutually consecutive frames and detects an action pattern; when the action pattern detected by the action pattern detection unit 264b matches a preset standard pattern, the pattern comparison unit 264c decides that the action matching the standard pattern has been performed, and outputs a decision result to this effect (step S11 in FIG. 2). If the action pattern does not match any standard pattern, information to that effect is output.

A standard pattern indicates the features of a gesture; it is determined on the basis of the results of measurements or the like made in advance, and stored in the standard pattern storage unit 264d. Among the features of a gesture are the shape of the hand, changes therein, movement (change of position), and so on.

A change in the shape of the hand is, for example, the opening of a clenched hand as in FIG. 28(*a*) (a change from 'rock' in frame n−α to 'paper' in frame n), or the action of extending the index finger (frame n) from the clenched hand state (frame n−α) as in FIG. 28(*b*). Actions of this type are detected on the basis of information stored in the detected information storage unit 264a indicating the fingertip positions Dhp1-Dhp5 and the palm center position Dhp0 in the respective ones of a plurality of frames. That is, a change in shape is determined to have occurred when, without a major change in the coordinates of the center position Dhp0 over a plurality of frames, the coordinates of any or all of the fingertip positions Dhp1-Dhp5 change, or a previously detected fingertip becomes undetectable, or conversely, a fingertip that was not detected previously is detected.

As changes in the position of the hand, there are, for example, upward, downward, leftward, and rightward movements, and rotations. They are detectable when, without a major change in the positional relations of the fingertip positions Dhp1-Dhp5 and the palm center position Dhp0, these all move or rotate.

As changes in the position of the hand, tilting the hand toward the left or right can also be detected. Here, 'tilt' means a rotation in a comparatively narrow range. The 'tilt' action can be detected from movement (change in positional coordinates) of the detected fingertip positions (Dhp1-Dhp5) along traces describing circular arcs, with almost no change in the palm center position Dhp0. In a simpler way, it can be determined from a change in the directions (angles) of the fingertip positions Dhp1-Dhp5 with respect to the center position Dhp0.

Movement in the forward/backward direction of the hand (the depth direction) may also be detected. It is desirable in this case to obtain information representing position in the depth direction, but when there is only one image capture unit, precise depth direction information is difficult to obtain. As a method of detecting movement in the forward/ backward direction on the basis of images from a single image capture unit, changes in the area of the hand region, changes in the length of the mutual distances between feature points, and so on can be used.

The action information generated by the action information generating unit 264 becomes the output of the action determination unit 26. This output is information indicating the hand action determined by the action determination unit 26.

The manipulation content determination unit 27 selects a manipulation instruction Cb corresponding to the hand action Ca determined by the action determination unit 26, and outputs information indicating the selected manipulation instruction Cb to the display unit 31 and the unit under control 32 (step S12 in FIG. 2).

The manipulation instruction Cb corresponding to the hand action Ca is preset in the device so as to be uniquely determined.

Figure 29:
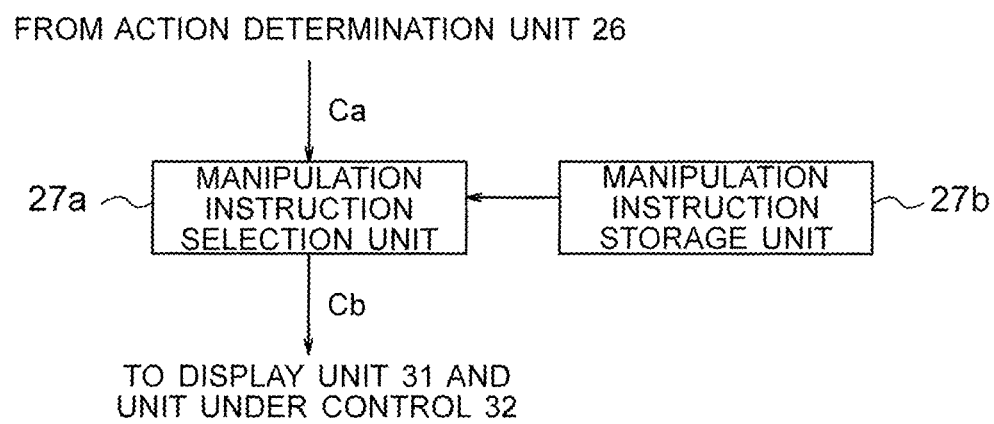
FIG. 29 is a block diagram showing an example of the configuration of a manipulation content determination unit 27 in FIG. 1.

The manipulation content determination unit 27 has, for example, a manipulation instruction selection unit 27a and a manipulation instruction storage unit 27b as shown in FIG. 29.

The manipulation instruction storage unit 27b stores manipulation instructions Cb in association with hand actions Ca in, for example, a table format; the manipulation instruction selection unit 27a supplies a hand action Ca to the manipulation instruction storage unit 27b as an address and thereby reads and outputs the data stored at that address as the corresponding manipulation instruction Cb.

Examples of manipulation instructions Cb corresponding to hand actions Ca are shown in FIG. 30. In the illustrated examples, when the hand is in the opened state and is moved upward from around the center, information indicating a manipulation instruction Cb that commands the action of performing processing to increase the volume of the audio device by one unit is output.

Settings such as this are basically prestored in the manipulation instruction storage unit 27b, but the configuration may be such that they can be changed according to the operator's preferences.

The display unit 31 receives manipulation instructions Cb from the manipulation content determination unit 27 and changes the displayed subject matter accordingly. Specifically, when the manipulation instruction Cb selected by the manipulation content determination unit 27 is an audio volume adjustment or the like, the volume setting is displayed on the display unit. Similar manipulation instructions can used for scroll of the screen displayed on the display unit 31, zoom in or out, or movement of the cursor on a menu. Furthermore, a position as such may be sent to the display unit 31 as the content of a manipulation, and used for pointing.

When a display is carried out on the display unit 31, visual attractiveness of the display may cause gaze shift to the display unit 31. Accordingly, the user may also be given a description of the instruction from the manipulation content determination unit 27 by use of voice, sound effects, or the like, in place of a display unit 31.

The unit under control 32 is a general term for any device, any function, or the like that operates according to manipulation instructions from the manipulation content determination unit 27. As examples, there are audio devices, an air conditioner, driving functions of the automobile, auxiliary functions of the automobile, and so on. As auxiliary functions of the automobile, there are alteration of the angles of side mirrors, opening and shutting of windows, locking of doors, and so on.

The display unit 31 can also be viewed as a unit under control 32.

A combination of a plurality of devices may be operated in coordination with each other as a unit under control 32.

In the above description, the case in which a gesture is performed by one hand is assumed, but the present invention can also be applied to cases in which a gesture is performed with both hands, and to cases in which a gesture is performed by hands of a plurality of people.

In the case of a manipulation input device to be mounted in a vehicle in which the manipulations are performed by the driver, the actions for gesture manipulation input are preferably simple, and for that purpose, manipulation input by the action of a plurality of hands is preferably avoided. In the case of a manipulation input device for entertainment apparatus, however, configurations that employ the actions of a plurality of hands are possible and in some cases desirable.

In the above description, the manipulative member that performs the gesture is a hand, but the present invention is not limited to this scheme; it may also be applied to cases in which another part of the human body is used to perform gesture manipulation input, and to cases in which a manipulative member other than part of the human body, for example, a fork-shaped member or a staff-shaped member, is used as a manipulative member to perform gesture manipulation input. In those cases, a manipulative member region detection unit, which is a generalization of the hand region detection unit in the embodiment, is used.

In order to perform gesture manipulation input with a manipulative member other than the hand, however, first it is necessary to take the manipulative member in the hand, which requires gaze movement. In a vehicle mounted manipulation input device that is operated by the driver, to obtain the effect of reducing movement of the driver's gaze, gesture manipulation input is preferably carried out by the hand.

When a home or office display device such as a television set, display monitor, projector or the like is being operated, however, gesture manipulation input can be carried out by a manipulative member other than the hand without incurring the above-mentioned problem.

Second Embodiment

Figure 31:
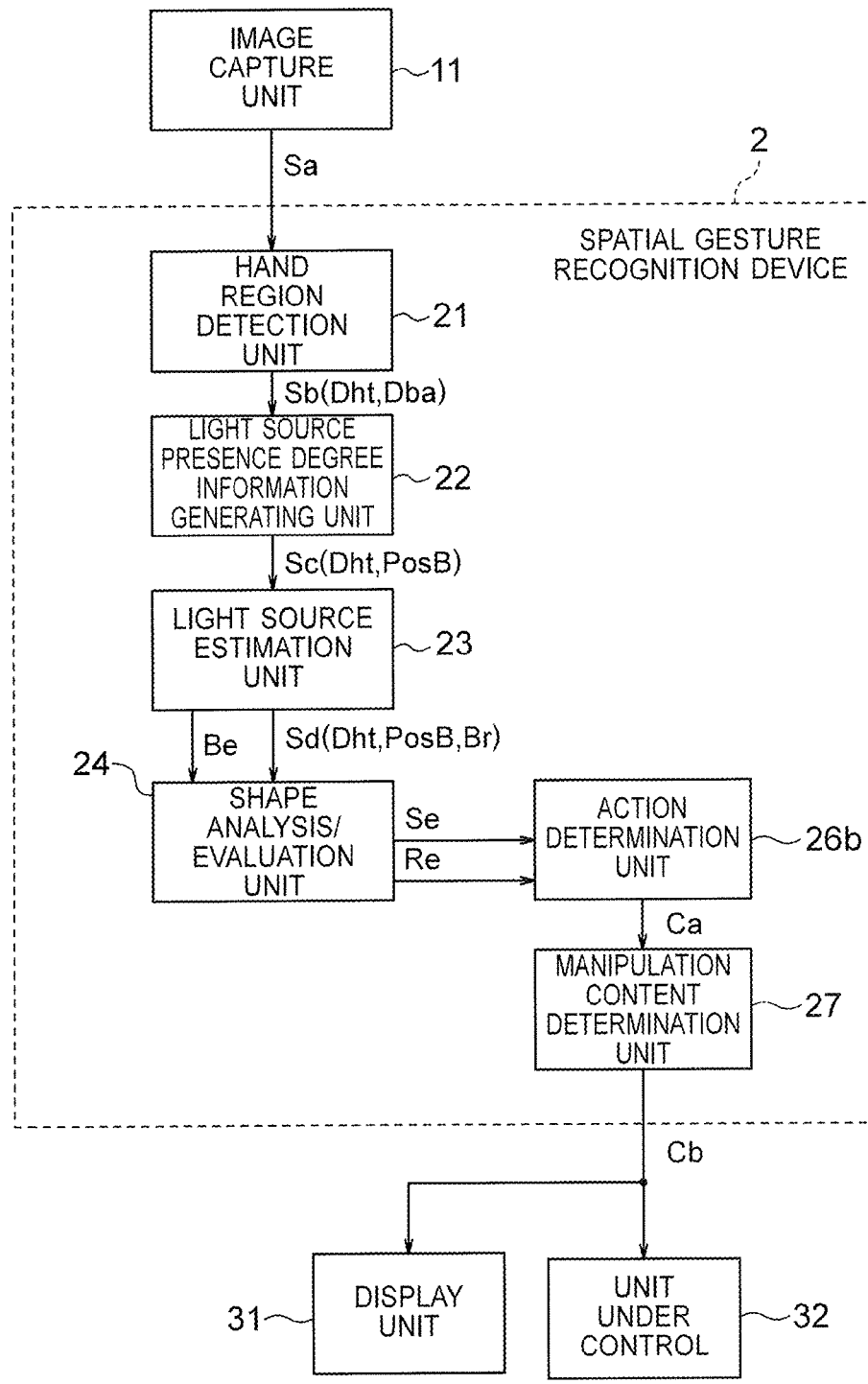
FIG. 31 is a block diagram showing the configuration of a manipulation input device according to a second embodiment of the present invention.

FIG. 31 is a block diagram showing the configuration of a manipulation input device according to a second embodiment of the present invention. The manipulation input device shown in FIG. 31 is generally the same as the manipulation input device shown in FIG. 1, and reference characters that are the same as in FIG. 1 denote identical or equivalent parts, but there is a difference in that an action determination unit 26b is provided in place of the action determination unit 26.

Figure 32:
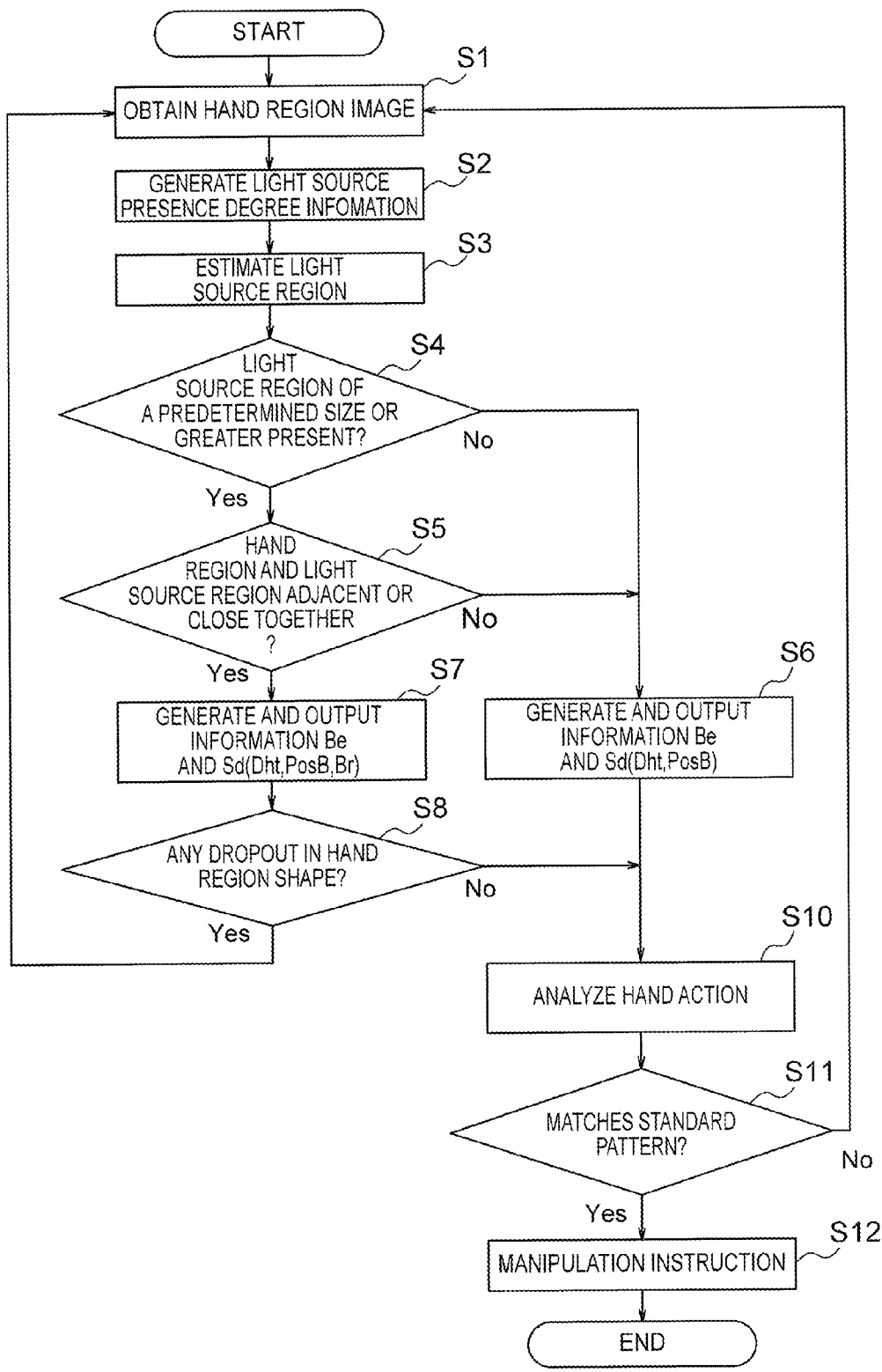
FIG. 32 is a flowchart illustrating the operation of the manipulation input device according to the second embodiment.

FIG. 32 is a flowchart according to the second embodiment of the present invention. The flowchart shown in FIG. 32 is generally the same as the flowchart shown in FIG. 2, and reference characters that are the same as in FIG. 2 denote identical or equivalent parts, but there is a difference in that step S9 is eliminated.

Figure 33:
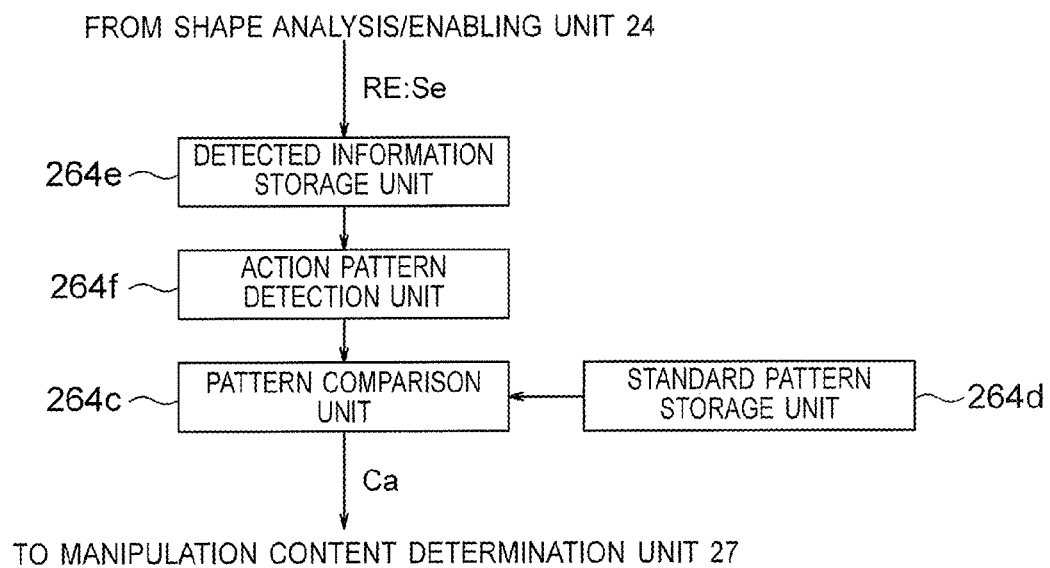
FIG. 33 is a block diagram showing an example of the configuration of an action determination unit 26b in FIG. 31.

The action determination unit 26b receives the image information Se and the result RE of the dropout presence/absence decision output from the shape analysis/evaluation unit 24 and, on the basis thereof, determines the action of the hand. As shown in FIG. 33, the action determination unit 26b has a detected information storage unit 264e, an action pattern detection unit 264f, a pattern comparison unit 264c, and a standard pattern storage unit 264d.

The detected information storage unit 264e stores the hand feature information DH and the decision result RE in each frame; the action pattern detection unit 264f analyzes the hand feature information DH and the decision results RE in a plurality of mutually consecutive frames and detects an action pattern.

The detected information storage unit 264e is generally the same as the detected information storage unit 264a in FIG. 27, but differs from the detected information storage unit 264a in that it stores the decision results RE as well as the hand feature information DH. The action pattern detection unit 264f is generally the same as the action pattern detection unit 264b in FIG. 27, but differs from the action pattern detection unit 264b in that it does or does not carry out its action analysis, depending on the decision result RE.

When the decision result RE indicates that 'a dropout is present' (Yes in step S8 in FIG. 32), the action pattern detection unit 264f does not analyze the hand action, and obtains the next hand region image (step S1 in FIG. 32). When the decision result RE indicates that 'no dropout is present' (No in step S8 in FIG. 32), it analyzes the hand action (step S10 in FIG. 32) and outputs the detected action pattern to the pattern comparison unit 264c.

The operations of the pattern comparison unit 264c and the standard pattern storage unit 264d are similar to those described in relation to the example in FIG. 27.

The manipulation input device according to the present embodiment which is configured in this way uses the result of the decision as to whether there is a dropout due to a light source, in the hand region and carries out the action determination, so that misrecognition of manipulation input (a gesture) due to a dropout can be reduced even when the hand region is eroded by a light source.

In the above-described example, when the shape analysis/evaluation unit 24 decides that a dropout is present (when RE='1'), the action determination unit 26b does not carry out the generation of action information, but instead of this, the action determination unit 26b may generate the action information by using the hand feature information DH of the preceding frame as the hand feature information DH of the current frame.

In the present embodiment, when a dropout is determined to be present (Yes in step S8), an immediate return is made to the process of obtaining a hand region image (S1), but it is also possible to proceed to step S12 and carry out a manipulation instruction responsive to 'dropout present'. For example, when the decision result RE indicating 'dropout present' is output from the shape analysis/evaluation unit 24, the action determination unit 26b may notify the manipulation content determination unit 27 of the decision result RE, and the manipulation content determination unit 27, on the basis of the decision result, may give a manipulation instruction for informing the operator that a dropout is present (that a dropout has occurred in the hand region in the captured image). The manipulation instruction in this case may be, for example, an instruction to perform display or voice output for informing the operator that a dropout is present.

The present invention has been described above as a manipulation input device, but the method carried out by the manipulation input device described above also constitutes part of the present invention. Moreover, a program for causing a computer to execute the processes carried out in the manipulation input device or the manipulation input method, and a computer-readable recording medium in which the program is recorded, also constitute part of the present invention.

REFERENCE CHARACTERS 2 spatial gesture recognition device, 11 image capture unit, 21 hand region detection unit, 22 light source presence degree information generating unit, 23 light source estimation unit, 24 shape analysis/evaluation unit, 26, 26b action determination unit, 27 manipulation content determination unit, 31 display unit, 32 unit under control, 241 feature analysis unit, 242 shape likelihood determination unit, 243 shape evaluation unit, 261 control unit, 262 shape correction unit, 263 selection unit, 264 action information generating unit.

What is claimed is:
1. A manipulation input device comprising:
a processor; and
a memory storing a program which, when executed, causes a computer to perform a process including,
detecting a hand region in a captured image obtained by imaging by an image capture unit;
setting a light source presence degree as an index indicating a probability that a light source is present, for each part of a background region comprising a region other than the detected hand region, on a basis of luminance or color of the part;
estimating, on a basis of the light source presence degree, a light source region which is a region affected by a light source in the captured image, and determining whether or not the estimated light source region and the detected hand region are within a predetermined distance of each other;
making a decision, on a basis of a shape of the detected hand region, as to whether or not a dropout has occurred in the hand region in the captured image, when the estimated light source region and the hand region are determined to be within the predetermined distance of each other; and making a determination of an action of a hand on a basis of a result of the decision made and information representing the detected hand region, wherein, when the decision is made that the dropout occurred in the detected hand region in the captured image, the determination of the action of the hand is made by correcting the shape of the detected hand region, and generating action information indicating the action of the hand on a basis of the corrected shape of the detected hand region.

2. The manipulation input device of claim 1, wherein the image obtained by the image capture unit is a moving image comprising a series of frames, each representing a still image;

on a basis of information representing the estimated light source region in the current frame, and information about a feature point in the hand region in at least one temporally preceding frame, an estimate is made of a position of the feature point in the hand region in the current frame, in the estimated light source region in the current frame; and the shape of the detected hand region is corrected on a basis of a result of the estimate.

3. The manipulation input device of claim 1, wherein the process further comprises giving a manipulation instruction corresponding to the action of the hand determined on a basis of a result of the determination made of the action of the hand.

4. The manipulation input device of claim 1, wherein the decision on whether or not the dropout occurred is made by:

detecting a position of a center of a palm;

determining a distance from the detected center of the palm to a perimeter of the hand region in each direction; and deciding whether or not the dropout has occurred in the hand region in the captured image on a basis of a relation between the distance in each direction and the direction.

5. The manipulation input device of claim 4, wherein the decision on whether or not the dropout occurred is made by:

estimating a probability that the relation between the distance in each direction and the direction corresponds to a shape of the hand made when a gesture for manipulation input is performed; and deciding whether or not the dropout has occurred in the hand region in the captured image on a basis of the estimated probability.

6. The manipulation input device of claim 4, wherein the decision on whether or not a dropout has occurred in the hand region in the captured image is made on a basis of a size of a direction range having only one local minimum point on a curve representing the relation between the distance in each direction and the direction.

7. The manipulation input device of claim 6, wherein said direction range is such that, when a local maximum point is present in an interior of the direction range on the curve representing the relation between the distance in each direction and the direction, a difference between the local maximum point and the local minimum point is smaller than a predetermined threshold value.

8. The manipulation input device of claim 6, wherein said direction range is such that, in the interior of the direction range, a magnitude of a change in the distance with respect to a change in the direction is equal to or less than a predetermined value.

9. The manipulation input device of claim 1, the process further comprising giving a manipulation instruction corresponding to the action of the hand determined on a basis of a result of the determination made on the action of the hand.

10. The manipulation input device of claim 9, wherein, when the process decides that the dropout has occurred in the hand region in the captured image, the process informs an operator that a dropout has occurred in the hand region in the captured image.

11. A manipulation input method comprising:

detecting a hand region in a captured image obtained by imaging by an image capture step;

setting a light source presence degree as an index indicating a probability that a light source is present, for each part of a background region comprising a region other than the detected hand region, on a basis of luminance or color of the part;

estimating, on a basis of the light source presence degree, a light source region which is a region affected by a light source in the captured image, and determining whether or not the estimated light source region and the detected hand region are within a predetermined distance of each other;

making a decision, on a basis of a shape of the detected hand region, as to whether or not a dropout has occurred in the hand region in the captured image, when the estimated light source region and the hand region are determined to be within the predetermined distance of each other; and making a determination of an action of a hand on a basis of a result of the decision made and information representing the detected hand region, wherein, when the decision is made that the dropout occurred in the detected hand region in the captured image, the determination of the action of the hand is made by correcting the shape of the detected hand region, and generating action information indicating the action of the hand on a basis of the corrected shape of the detected hand region.

12. A non-transitory computer readable recording medium in which a program for causing a computer to execute the steps in the manipulation input method as set forth in claim 11 is recorded.

* * * * *